US012795663B2

(12) United States Patent
Wu et al.

(10) Patent No.: US 12,795,663 B2
(45) Date of Patent: Nov. 10, 2026

(54) COMMUNICATION METHOD, ELECTRONIC DEVICE AND COMPUTER-READABLE STORAGE MEDIUM

(71) Applicant: Samsung Electronics Co., Ltd., Suwon-si (KR)

(72) Inventors: Min Wu, Beijing (CN); Feifei Sun, Beijing (CN); Sa Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 18/701,508

(22) PCT Filed: Oct. 28, 2022

(86) PCT No.: PCT/KR2022/016712
§ 371 (c)(1),
(2) Date: Apr. 15, 2024

(87) PCT Pub. No.: WO2024/090627
PCT Pub. Date: May 2, 2024

(65) Prior Publication Data

US 2025/0008508 A1 Jan. 2, 2025

(30) Foreign Application Priority Data

Oct. 18, 2021 (CN) ......................... 202111210744.2

(51) Int. Cl.
*H04W 72/1268* (2023.01)
*H04W 72/0457* (2023.01)
(Continued)

(52) U.S. Cl.
CPC ... *H04W 72/1268* (2013.01); *H04W 72/0457* (2023.01); *H04W 72/566* (2023.01); *H04W 80/02* (2013.01)

(58) Field of Classification Search
CPC ......... H04W 72/1268; H04W 72/0457; H04W 72/566
See application file for complete search history.

(56) References Cited

U.S. PATENT DOCUMENTS 8,699,487 B2 4/2014 Damnjanovic et al.
2019/0159148 A1 5/2019 Jung et al.
(Continued)

OTHER PUBLICATIONS

Intel Corporation, Enhancements to Buffer Status Reporting for XR Traffic, R2-2209636, 3GPP TSG-RAN WG2 Meeting #119bis-e, Sep. 30, 2022.
(Continued)

*Primary Examiner* — Erika A Washington
(74) *Attorney, Agent, or Firm* — Jefferson IP Law, LLP

(57) ABSTRACT

The disclosure relates to a 5G or 6G communication system for supporting a higher data transmission rate. Embodiments of the present disclosure provide a communication method, an electronic device and a computer-readable storage medium. For an uplink service, the method comprises steps of: by a user equipment, determining a remaining PDB of a data packet in a buffer, and reporting related information of the remaining PDB to a base station, so as to assist the base station to perform proper uplink scheduling for the User Equipment according to the related information of the remaining PDB. Accordingly, the packet loss rate of data packets is reduced, and the transmission efficiency is improved.

14 Claims, 23 Drawing Sheets

(51) Int. Cl.
*H04W 72/566* (2023.01)
*H04W 80/02* (2009.01)

(56) References Cited

U.S. PATENT DOCUMENTS

| | | | | |
|---|---|---|---|---|
| 2019/0200307 | A1 | 6/2019 | Si et al. | |
| 2020/0236653 | A1 | 7/2020 | Astrom et al. | |
| 2021/0195654 | A1 | 6/2021 | Lei et al. | |
| 2021/0385710 | A1 | 12/2021 | Jin et al. | |
| 2023/0080157 | A1* | 3/2023 | Ko | H04W 74/0808 370/329 |
| 2024/0205887 | A1* | 6/2024 | Lin | H04L 5/003 |
| 2024/0260002 | A1* | 8/2024 | Ko | H04W 72/0446 |
| 2024/0291534 | A1* | 8/2024 | Ko | H04L 5/0048 |

OTHER PUBLICATIONS

Huawei et al., Handling of XR PDU sets in RAN, R2-2210201, 3GPP TSG-RAN WG2 Meeting #119bis-e, Sep. 30, 2022.
Vivo, Discussion on feedback enhancements for XR-specific capacity improvements, R2-2209490, 3GPP TSG-RAN WG2 Meeting #119bis-e, Sep. 30, 2022.
LG Electronics Inc.; Discussion on BSR enahancement for timing information in XR, R2-2210599, 3GPP TSG-RAN WG2 Meeting #119bis, Sep. 9, 2022.
3GPP; TSG RAN; NR; Base Station (BS) radio transmission and reception (Release 17), 3GPP TS 38.104 V17.2.0, Jul. 7, 2021.
International Search Report dated Jul. 10, 2023, issued in International Application No. PCT/KR2022/016712.

* cited by examiner

FIG. 11

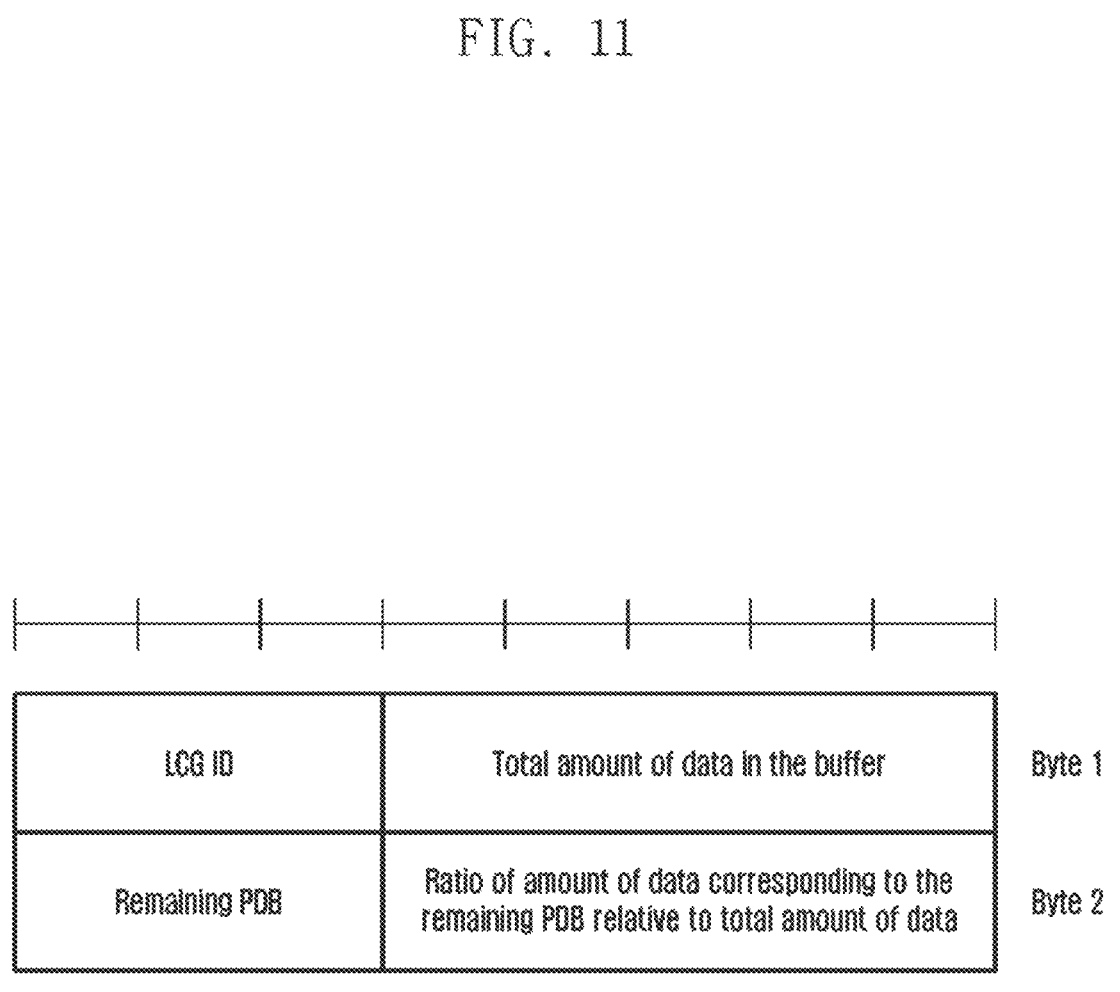

| | | |
|---|---|---|
| LCG ID | Total amount of data in the buffer | Byte 1 |
| Remaining PDB | Ratio of amount of data corresponding to the remaining PDB relative to total amount of data | Byte 2 |

COMMUNICATION METHOD, ELECTRONIC DEVICE AND COMPUTER-READABLE STORAGE MEDIUM

TECHNICAL FIELD

The present disclosure relates to the technical field of wireless communication, and in particular to a communication method, an electronic device and a computer-readable storage medium.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In a task for the Rel-17 standard, the 3GPP organization studied enhanced technologies based on Extended Reality (XR) for the first time, including studying XR service models, and studying enhancement technologies in capacity, power consumption, mobility or the like based on the XR service models. The XR services include enhancement services of Augmented Reality (AR), Virtual Reality (VR), Mixed Reality (MR), Cinematic Reality (CR) and other realities. These services have a feature of irregular transmission cycle, high reliability, low transmission delay, low power consumption, jitter of arrival time or the like.

One important feature of the XR services is real-time performance, which has a strict requirement for the transmission delay. After a Packet Delay Bucket (PDB) is exceeded, it has already become meaningless to transmit data packets. How to reduce the packet loss rate of data is one of the problems to be solved in the implementation of XR or other services at present.

DISCLOSURE OF INVENTION

Technical Problem

The purpose of this application is to be able to solve at least one of the drawbacks of the prior art.

An objective of the embodiments of the present disclosure is to solve the problem how to reduce the packet loss rate of data.

Solution to Problem

In accordance with one aspect of the embodiments of the present disclosure, a method executed by a User Equipment (UE) is provided, comprising steps of: determining a remaining PDB of a data packet in a buffer; and transmitting related information of the remaining PDB to a base station.

Optionally, the related information of the remaining PDB includes at least one of the following: a remaining PDB value of the remaining PDB; information indicating whether the remaining PDB value is smaller than a first predetermined threshold; a size of a data packet having a remaining PDB with a remaining PDB value smaller than the first predetermined threshold, or a relative ratio of the size of the data packet; or an Identity Document (ID) of a Logical Channel (LCH) or a Logical Channel Group (LCG) to which the data packet having the remaining PDB value smaller than the first predetermined threshold, wherein the relative ratio of the size of the data packet includes at least one of the following: a ratio of the size of the data packet relative to a total amount of data in all buffers; a ratio of the size of the data packet relative to a total amount of data in an LCG to which the data packet belongs; or a ratio of the size of the data packet relative to a total amount of data in an LCH to which the data packet belongs.

Optionally, the related information of the remaining PDB includes at least one of the following: a size of a data packet corresponding to the remaining PDB, or a relative ratio of the size of the data packet; or the ID of the LCH or the LCG to which a data packet corresponding to the remaining PDB belongs.

In accordance with another aspect of the embodiments of the present disclosure, a user equipment (UE) is provided. The UE comprises a transceiver and a processor, which is coupled to the transceiver and configured to: determine a remaining Packet Budget (PDB) of a data packet in a buffer, and transmit, to a base station, related information of the remaining PDB.

Advantageous Effects of Invention

Embodiments of the present disclosure provides methods and apparatus for assisting the base station to perform proper uplink scheduling for the UE within the remaining PDB as far as possible.

Accordingly, the packet loss rate of data packets is reduced, and the transmission efficiency is improved.

BRIEF DESCRIPTION OF DRAWINGS

In order to explain the technical solutions in the embodiments of the present disclosure more clearly, the accompanying drawings to be used in the description of the embodiments of the present disclosure will be briefly illustrated below.

FIG. 11 is a fifth example diagram of reporting information according to an embodiment of the present disclosure;

MODE FOR THE INVENTION

Figure 1:
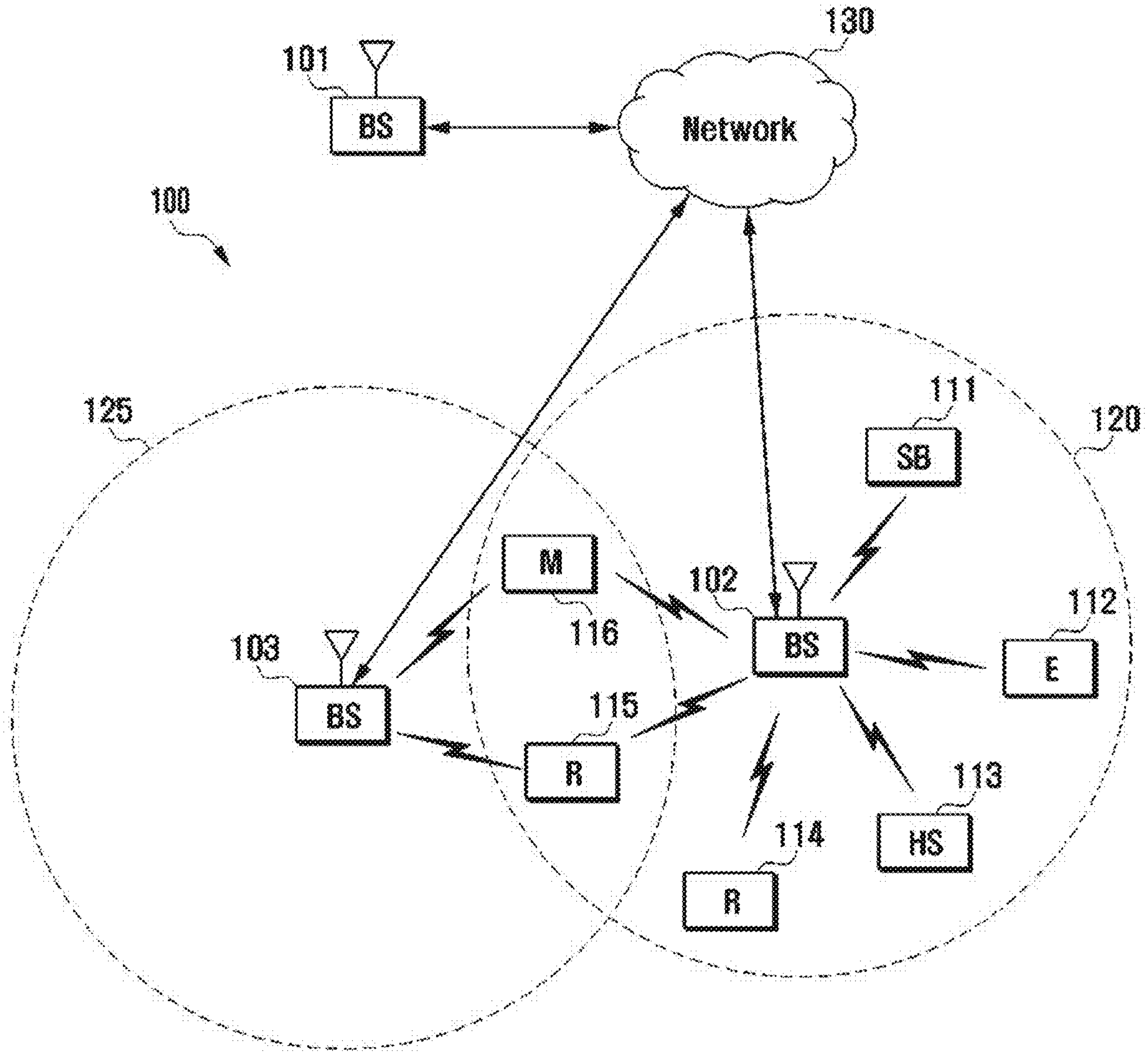
FIG. 1 is a schematic diagram of an overall structure of a wireless network according to an embodiment of the present disclosure.

The following description is provided with reference to the accompanying drawings to facilitate the comprehensive understanding of various embodiments of the present disclosure defined by the claims and equivalents thereof. The description includes various specific details to facilitate understanding, but it should only be regarded as being exemplary. Therefore, it should be recognized by those skilled in the art that various alterations and modifications can be made to various embodiments described herein without departing from the scope and spirit of the present disclosure. In addition, for the sake of clarity and conciseness, the description of well-known functions and structures can be omitted.

The terms and words used in the following description and claims are not limited to their dictionary meanings, and are merely used by the inventor to clearly and consistently understand the present disclosure. Therefore, it should be obvious to those skilled in the art that, the following description of various embodiments of the present disclosure is merely for the purpose of illustration, rather than limiting the present disclosure defined by the appended claims and equivalents thereof.

It should be understood that singular forms such as "a", "an" and "the" include plural forms, unless otherwise clearly indicated in the context. Therefore, for example, the reference to "a component surface" includes references to one or more such surfaces.

The term "comprise" or "may comprise" refers to the presence of correspondingly disclosed functions, operations or components that can be used in various embodiments of the present disclosure, but does not limit the presence of one or more additional functions, operations or features. In addition, the term "comprise" or "having" can be interpreted as representing some characteristics, digits, steps, operations, constituent elements, components or combinations thereof, but should not be interpreted as excluding the possibility of presence of one or more other characteristics, digits, steps, operations, constituent elements, components or combinations thereof.

The term "or" used in various embodiments of the present disclosure includes any listed term and all combinations thereof. For example, "A or B" may include A, may include B or may include both A and B.

Unless otherwise defined, all terms (including technical terms or scientific terms) used in the present disclosure have the same meaning as those understood by those skilled in the art. For example, the common terms defined in dictionaries are interpreted as having meanings consistent with the context in the related art, and should not be interpreted in an idealized or overly formalized manner, unless otherwise clearly defined in the present disclosure.

Exemplary embodiments of the present disclosure will be further described below with reference to the accompanying drawings.

The text and the accompanying drawings are merely provided as examples to help readers to understand the present disclosure. They are not intended to limit the scope of the present disclosure in any way. Although some embodiments and examples have been provided, based on the contents disclosed herein, it is obvious to those skilled in the art that the illustrated embodiments and examples can be altered without departing from the scope of the present disclosure.

FIG. 1 shows an exemplary wireless network 100 according to various embodiments of the present disclosure. The embodiment of the wireless network 100 shown in FIG. 1 is merely for the purpose of illustration. Other embodiments of the wireless network 100 can be used without departing from the scope of the present disclosure.

The wireless network 100 includes a gNodeB (gNB) 101, a gNB 102 and a gNB 103. The gNB 101 communicates with the gNB 102 and the gNB 103. The gNB 101 also communicates with at least one Internet protocol (IP) network 130 (e.g., Internet, private IP networks or other data networks).

Depending upon the network type, other well-known terms such as "base station" or "access point" can be used to replace "gNodeB" or "gNB". For convenience, the terms "gNodeB" and "gNB" are used in this patent document to refer to a network infrastructure component that provides radio access for a remote terminal. In addition, depending upon the network type, other well-known terms such as "mobile station", "user station", "remote terminal", "wireless terminal" or "user device" can be used to replace the "user equipment" or "UE". For convenience, the terms "user equipment" and "UE" are used in this patent document to refer to a remote wireless device that wirelessly accesses to the gNB, no matter whether the UE is a mobile device (e.g., a mobile phone or a smart phone) or a generally-recognized immobile device (e.g., a desktop computer or a vending machine).

The gNB 102 provides wireless broadband access to a network 130 for a plurality of first UEs within a coverage region 120 of the gNB 102. The plurality of first UEs include: a UE 111, which can be located in a small enterprise (SB); a UE 112, which can be located in an enterprise (E); a UE 113, which can be located in a WiFi hotspot (HS); a UE 114, which can be located in a first residence (R); a UE 115, which can be located in a second residence (R); and, a UE 116, which can be a mobile device (M), for example, a cellular phone, a wireless laptop computer, a wireless PDA, etc. The gNB 103 provides wireless broadband access to the network 130 for a plurality of second UEs within a coverage region 125 of the gNB 103. The plurality of second UEs include a UE 115 and a UE 116. In some embodiments, one or more of gNBs 101 to 103 can communicate with each other and communicate with UEs 111 to 116 by using 5G, long term evolution (LTE), LTE-A, WiMAX or other advanced wireless communication technologies.

The dashed line shows the approximate range of the coverage regions 120 and 125, and this range is shown as being approximately circular only for the purpose of illustration and explanation. It should be clearly understood that the coverage region associated with the gNB (e.g., the coverage regions 120 and 125) can have other shapes, including irregular shapes, depending upon the configuration of the gNB and the change of the radio environment associated with natural obstacles and artificial obstacles.

As described in more detail below, one or more of the gNB 101, the gNB 102 and the gNB 103 comprises a 2D antenna array described in the embodiments of the present disclosure. In some embodiments, one or more of the gNB 101, the gNB 102 and the gNB 103 supports the codebook design and structure for a system having a 2D antenna array.

Although FIG. 1 shows an example of the wireless network 100, various alterations can be made to FIG. 1. For example, the wireless network 100 can comprise any number of gNBs and any number of UEs in any suitable arrangement. Furthermore, the gNB 101 can directly communicate with any number of UEs, and provide wireless broadband access to the network 130 for these UEs. Similarly, each of the gNBs 102 to 103 can directly communicate with the network 130 and provide direct wireless broadband access to the network 103 for UEs. In addition, the gNB 101, 102 and/or 103 can provide access to other or additional external networks (e.g., external telephone networks or other types of data networks).

Figure 2A:
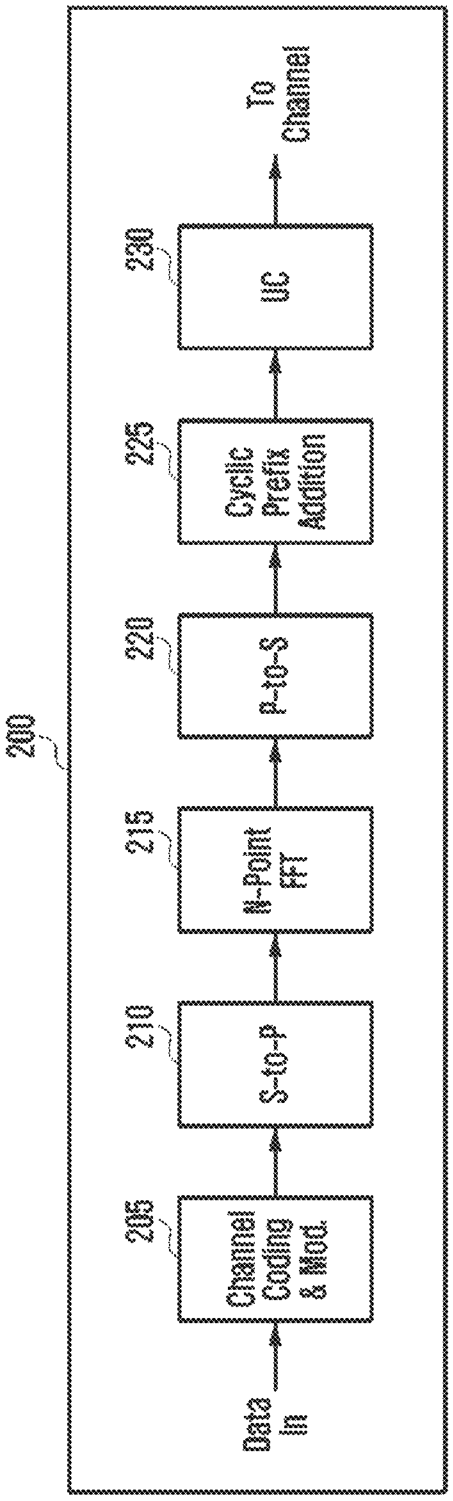
FIG. 2*a* is a schematic diagram of a transmitting path according to an embodiment of the present disclosure.
Figure 2B:
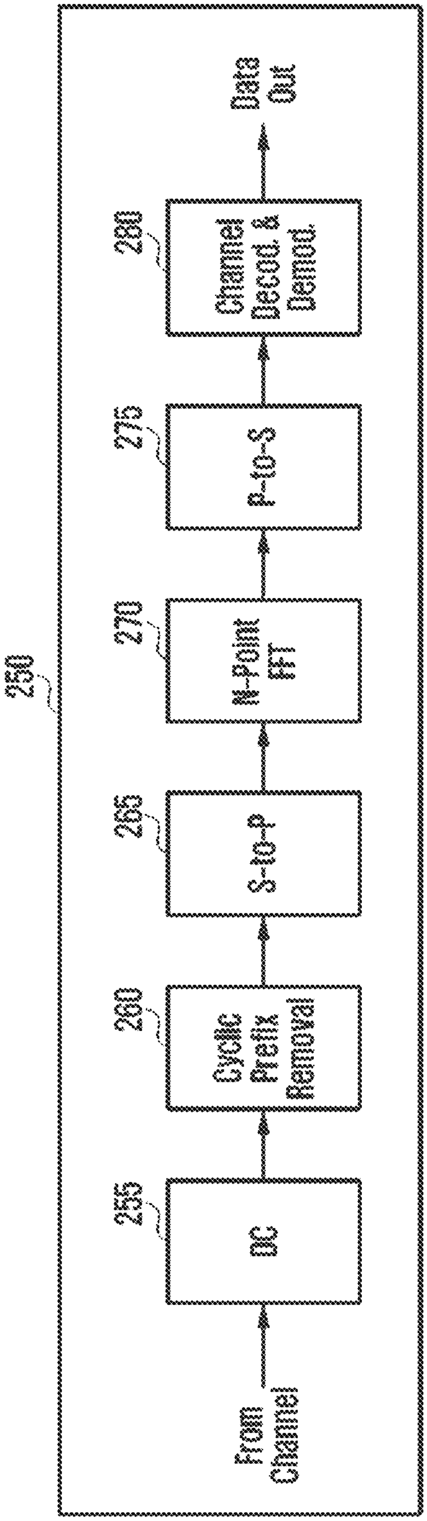
FIG. 2*b* is a schematic diagram of a receiving path according to an embodiment of the present disclosure.

FIGS. 2*a* and 2*b* show exemplary wireless transmitting and receiving paths according to the present disclosure. In the following description, the transmitting path 200 can be described as being implemented in a gNB (e.g., gNB 102), while the receiving path 250 can be described as being implemented in a UE (e.g., UE 116). However, it should be understood that the receiving path 250 can be implemented in a gNB while the transmitting path 200 can be implemented in a UE. In some embodiments, the receiving path 250 is configured to support the codebook design and structure for a system having the 2D antenna array described in the embodiments of the present disclosure.

The transmitting path 200 comprises a channel coding and modulation block 205, a serial-to-parallel (S-to-P) block 210, an N-point inverse fast Fourier transform (IFFT) block 215, a parallel-to-serial (P-to-S) block 220, a cyclic prefix addition block 225 and an up-converter (UC) 230. The receiving path 250 comprises a down-converter (DC) 255, a cyclic prefix removal block 260, a serial-to-parallel (S-to-P) block 265, an N-point fast Fourier transform (FFT) block 270, a parallel-to-serial (P-to-S) block 275 and a channel decoding and demodulation block 280.

In the transmitting path 200, the channel coding and modulation block 205 receives a set of information bits, and performs coding (e.g., low-density parity check (LDPC) coding and modulation on input bits (e.g., by quadrature phase shift keying (QPSK) or quadrature amplitude modulation (QAM)) to generate a sequence of frequency domain modulation symbols. The serial-to-parallel (S-to-P) block 210 converts (e.g., demultiplexes) a serial modulation symbol into parallel data to generate N parallel symbol streams, where N is the number of IFFT/FFT points used in the gNB 102 and the UE 116. The N-point IFFT block 215 performs an IFFT operation on the N parallel symbol streams to generate a time domain output signal. The parallel-to-serial block 220 converts (e.g., multiplexes) the parallel time domain output signal from the N-point IFFT block 215 to generate a serial time domain signal. The cyclic prefix addition block 225 interpolates a cyclic prefix into the time domain signal. The upconverter 230 modulates (e.g., upconverts) the output from the cyclic prefix addition block 225 to an RF frequency for transmission through a wireless channel. Before being converted to the RF frequency, the signal can also be filtered at the baseband.

The RF signal transmitted from the gNB 102 reaches the UE 116 after passing through the wireless channel, and an operation opposite to the operation at the gNB 102 is executed at the UE 116 The down-converter 255 down-converts the received signal to a baseband frequency, and the cyclic prefix removal block 260 removes the cyclic prefix to generate a serial time domain baseband signal. The serial-to-parallel block 265 converts the time domain baseband signal into a parallel time domain signal. The N-point FFT block 270 executes an FFT algorithm to generate N parallel frequency domain signals. The parallel-to-serial block 275 converts the parallel frequency domain signals into a sequence of modulation data symbols. The channel decoding and demodulation block 280 performs demodulation and decoding on the modulation symbols to restore the original input data stream.

Each of the gNBs 101 to 103 can implement a transmitting path 200 similar to transmitting to UEs 111 to 116 in a downlink, and can implement a receiving path 250 similar to receiving from UEs 111 to 116 in an uplink. Similarly, each of the UEs 111 to 116 can implement a transmitting path 200 for transmitting to gNBs 101 to 103 in an uplink, and can implement a receiving path 250 for receiving from gNBs 101 to 103 in a downlink.

Each of the components in FIGS. 2*a* and 2*b* can be implemented by only software, or implemented by a combination of hardware and software/firmware. As a specific example, at least some of the components in FIGS. 2*a* and 2*b* can be implemented by software, while other components can be implemented by configurable hardware or a mixture of software and configurable hardware. For example, the FFT block 270 and the IFFT block 215 can be implemented as configurable software algorithms, wherein the value of the point number N can be altered according to implementations.

In addition, although the use of FFT and IFFT has been described, it is merely illustrative and it should not be interpreted as limiting the scope of the present disclosure. Other types of transform can also be used, for example, discrete Fourier transform (DFT) and inverse discrete Fourier transform (IDFT) functions. It should be understood that, for DFT and IDFT functions, the value of the variable N may be any integer (e.g., 1, 2, 3, 4, etc.); while for FFT and IFFT functions, the value of the variable N may be any integer as the power of 2 (e.g., 1, 2, 4, 8, 16, etc.).

Although FIGS. 2*a* and 2*b* show the examples of the wireless transmitting and receiving paths, various alterations can be made to FIGS. 2*a* and 2*b*. For example, various components in FIGS. 2*a* and 2*b* can be combined, subdivided or omitted, and additional components can be added according to specific requirements. Moreover, FIGS. 2*a* and 2*b* are intended to show the examples of the types of transmitting and receiving paths that can be used in the wireless network. Any other suitable architecture can be used to support the wireless communication in the wireless network.

Figure 3A:
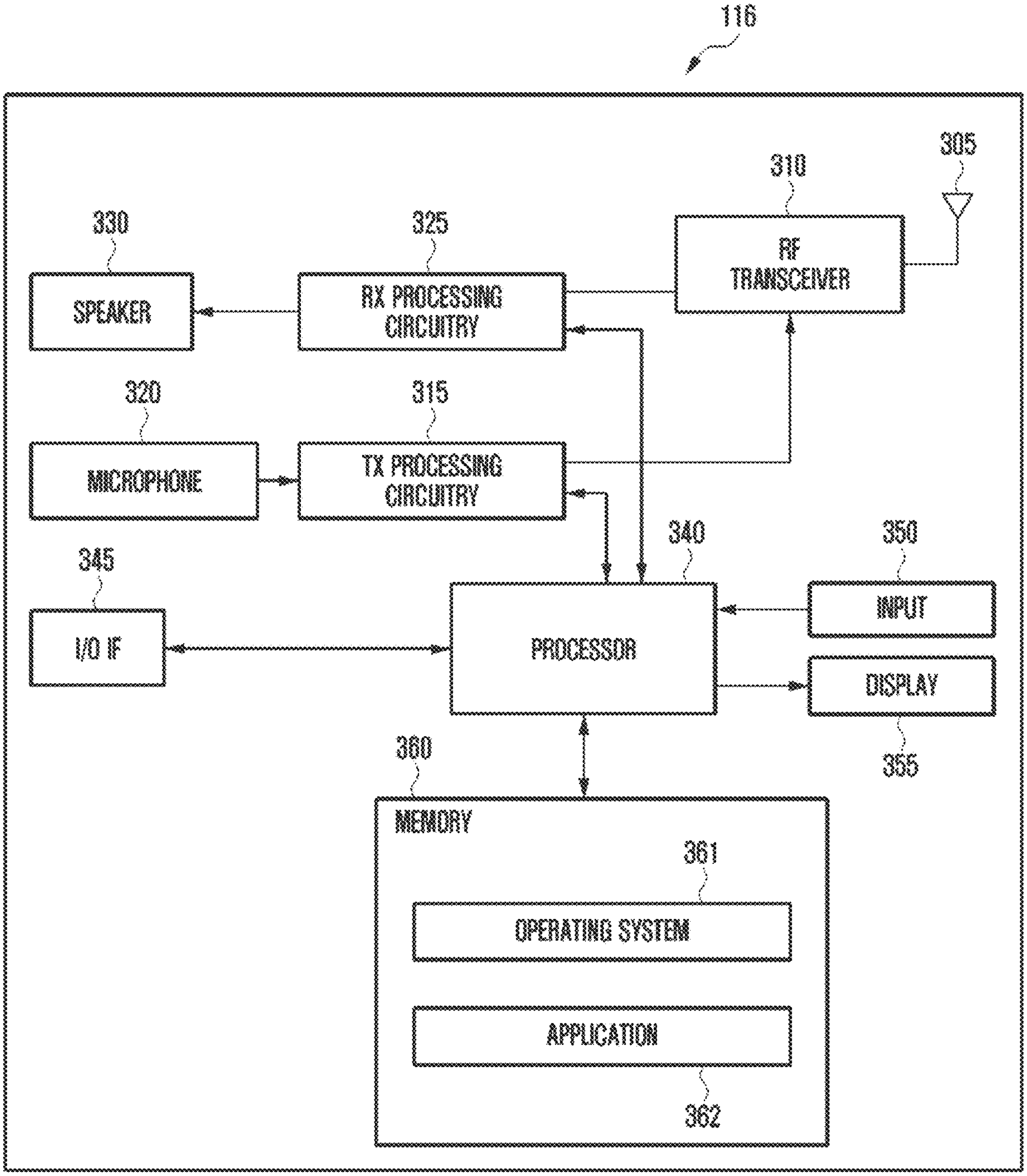
FIG. 3*a* is a schematic structure diagram of a UE according to an embodiment of the present disclosure.

FIG. 3*a* shows an exemplary UE 116 according to the present disclosure. The embodiment of the UE 116 shown in FIG. 3*a* is merely for the purpose of illustration, and the UEs 111 to 115 in FIG. 1 can have the same or similar configuration. However, the UE has various configurations, and FIG. 3*a* does not limit the scope of the present disclosure to any specific implementation of the UE.

The UE 116 comprises an antenna 305, a radio frequency (RF) transceiver 310, a transmitting (TX) processing circuit 315, a microphone 320 and a receiving (RX) processing circuit 325. The UE 116 further comprises a loudspeaker 330, a processor/controller 340, an input/output (I/O) interface (IF) 345, an input device(s) 350, a display 355 and a memory 360. The memory 360 comprises an operating system (OS) 361 and one or more applications 362.

The RF transceiver 310 receives, from the antenna 305, an incoming RF signal transmitted by the gNB in the wireless network 100. The RF transceiver 310 downconverts the incoming RF signal to generate an intermediate-frequency (IF) or baseband signal. The IF or baseband signal is transmitted to the RX processing circuit 325, and the RX processing circuit 325 performs filtering, decoding and/or digitization on the baseband or IF signal to generate the processed baseband signal. The RX processing circuit 325 transmits the processed baseband signal to the loudspeaker 330 (e.g., for voice data) or transmitted to the processor/controller 340 (e.g., for network browsing data) for further processing.

The TX processing circuit 315 receives the analog or digital voice data from the microphone 320 or receives other outgoing baseband data (e.g., network data, e-mail or interactive video game data) from the processor/controller 340. The TX processing circuit 315 performs encoding, multiplexing and/or digitization on the outgoing baseband data to generate the processed baseband or IF signal. The RF transceiver 310 receives the processed outgoing baseband or IF signal from the TX processing circuit 315, and up-converts the baseband or IF signal into the RF signal transmitted by the antenna 305.

The processor/controller 340 can comprise one or more processors or other processing devices, and execute the OS 361 store in the memory 360 so as to control the overall operation of the UE 116. For example, the processor/controller 340 can control the reception of forward channel signals and the transmission of backward channel signals through the RF transceiver 310, the RX processing circuit 325 and the TX processing circuit 315 according to the well-known principles. In some embodiments, the processor/controller 340 comprises at least one microprocessor or microcontroller.

The processor/controller 340 can also execute other processes and programs residing in the memory 360, for example, channel quality measurement and reporting operations for a system having the 2D antenna array described in the embodiments of the present disclosure. The processor/controller 340 can migrate data into or out of the memory 360 according to the requirements of the execution process. In some embodiments, the processor/controller 340 is configured to execute the application 362 on the basis of the OS 361 or in response to the signal received from the gNB or the operator. The processor/controller 340 is also coupled to the I/O interface 345, and the I/O interface 345 provides the UE 116 with the ability to be connected to other devices such as laptop computers and handheld computers. The I/O interface 345 is a communication path between these accessories and the processor/controller 340.

The processor/controller 340 is also coupled to the input device(s) 350 and the display 355. The operator of the UE 116 can use the input device(s) 350 to input data into the UE 116. The display 355 can be a liquid crystal display or other displays capable of presenting text and/or at least finite graphics (e.g., from a website). The memory 360 is coupled to the processor/controller 340. A part of the memory 360 can comprise a Random Access Memory (RAM), while the other part of the memory 360 can comprise a flash memory or other Read Only Memories (ROMs).

Although FIG. 3*a* shows an example of the UE 116, various alterations can be made to FIG. 3*a*. For example, various components in FIG. 3*a* can be combined, subdivided or omitted, and additional components can be added according to specific requirements. As a specific example, the processor/controller 340 can be divided into a plurality of processors, for example, one or more Central Processing Units (CPUs) and one or more graphic processing units (GPUs). Moreover, although FIG. 3*a* shows the UE 116 configured as a mobile phone or a smart phone, the UE can be configured to be operated as other types of mobile or immobile devices.

Figure 3B:
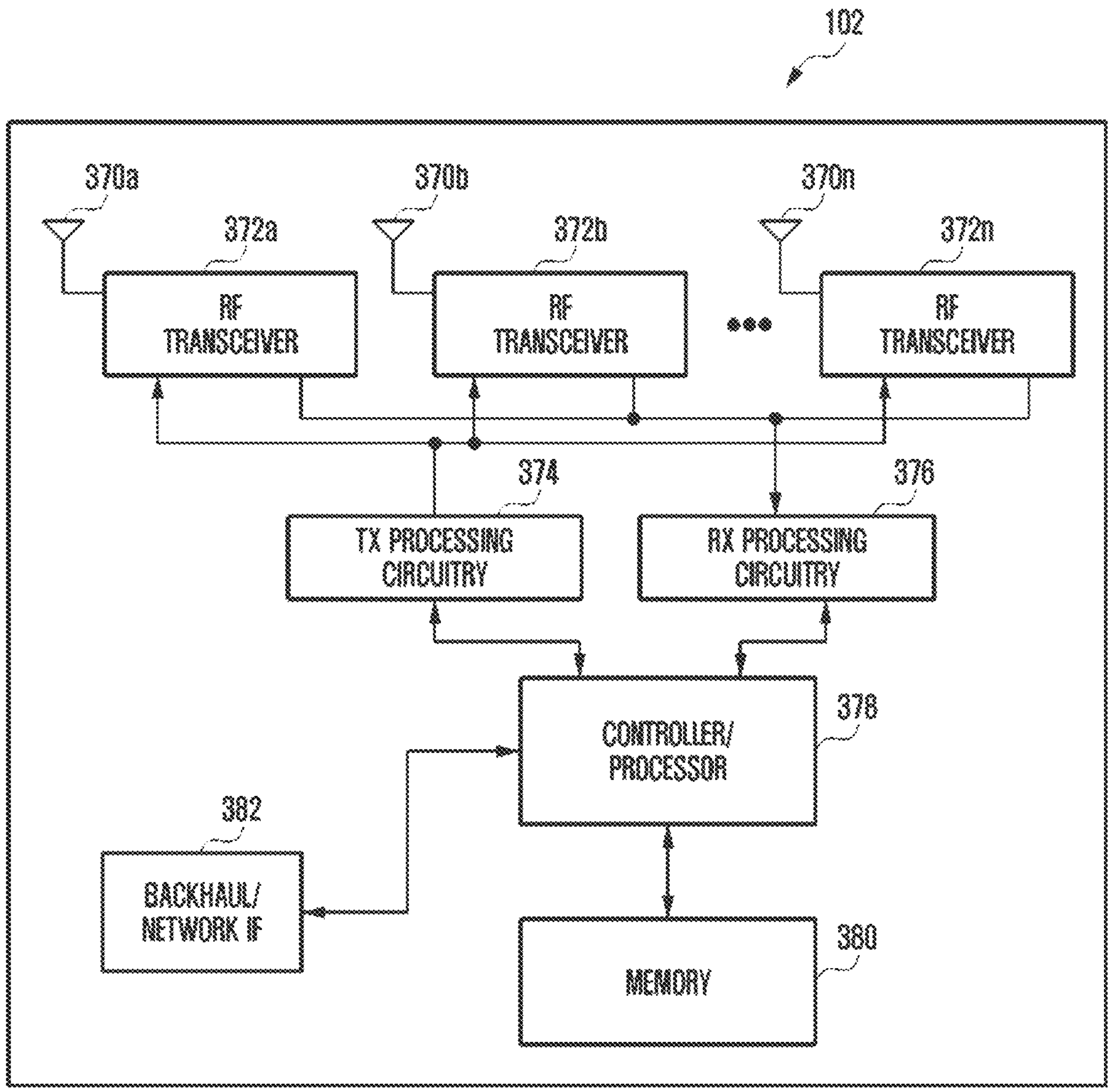
FIG. 3*b* is a schematic structure diagram of a base station according to an embodiment of the present disclosure.

FIG. 3*b* shows an exemplary gNB 102 according to the present disclosure. The embodiment of the gNB 102 shown in FIG. 3*b* is merely for the purpose of illustration, and other gNBs in FIG. 1 can have the same or similar configuration. However, the gNB has various configurations, and FIG. 3*b* does not limit the scope of the present disclosure to any specific implementation of the gNB. It is to be noted that the gNB 101 and the gNB 103 can comprise a structure the same as or similar to that of the gNB 102.

As shown in FIG. 3*b*, the gNB 102 comprises a plurality of antennas 370*a* to 370*n*, a plurality of RF transceivers 372*a* to 372*n*, a TX processing circuit 374 and an RX processing circuit 376. In some embodiments, one or more of the plurality of antennas 370*a* to 370*n* comprise a 2D antenna array. The gNB 102 further comprises a controller/processor 378, a memory 380 and a backhaul or network interface 382.

The RF transceivers 372*a* to 372*n* receive incoming RF signals from the antennas 3701 to 370*n*, for example, signals transmitted by the UE or other gNBs. The RF transceivers 372*a* to 372*n* down-convert the incoming RF signals to generate IF or baseband signals. The IF or baseband signals are transmitted to the RX processing circuit 376, and the RX processing circuit 376 performs filtering, decoding and/or digitization on the baseband or IF signals to generate the processed baseband signals. The RX processing circuit 376 transmits the processed baseband signals to the controller/processor 378 for further processing.

The TX processing circuit 374 receives analog or digital data (e.g., voice data, network data, e-mail or interactive video game data) from the controller/processor 378. The TX processing circuit 374 performs encoding, multiplexing and/or digitization on the outgoing baseband data to generate the processed baseband or IF signal. The RF transceivers 372*a* to 372*n* receive the processed outgoing baseband or IF signal from the TX processing circuit 374, and up-convert the baseband or IF signal into the RF signals transmitted by the antennas 370*a* to 370*n*.

The controller/processor 378 can comprise one or more processors or other processing devices for controlling the overall operation of the gNB 102. For example, the controller/processor 378 can control the reception of forward channel signals and the transmission of backward channel signals through the RF transceivers 372*a* to 372*n*, the RX processing circuit 376 and the TX processing circuit 374 according to the well-known principles. The controller/processor 378 can also support additional functions, such as more advanced wireless communication functions. For example, the controller/processor 378 can execute a BIS process, for example, by a blind interference sensing (BIS) algorithm, and decode the received signal from which the interference signal is removed. The controller/processor 378 can support, in the gNB 102, any one of various other functions. In some embodiments, the controller/processor 378 comprises at least one microprocessor or microcontroller.

The controller/processor 378 can also execute programs and other processes (e.g., the basic OS) residing in the memory 308. The controller/processor 378 can also support channel quality measurement and reporting for a system having the 2D antenna array described in the embodiments of the present disclosure. In some embodiments, the controller/processor 378 supports the communication between entities such as web RTCs. The controller/processor 378 can migrate data into or out of the memory 380 according to the requirements of the execution process.

The controller/processor 378 is also coupled to the backhaul or network interface 382. The backhaul or network interface 382 allows the gNB 102 to communicate with other devices or systems through a backhaul connection or a network. The backhaul or network interface 382 can support communication through any suitable wired or wireless connection(s). For example, when the gNB 102 is implemented as a part of a cellular communication system (e.g., a cellular communication system supporting 5G or new radio access technology or NR, LTE or LTE-A), the backhaul or network interface 382 can allow the gNB 102 to communicate with other gNBs through a wired or wireless backhaul connection. When the gNB 102 is implemented as an access point, the backhaul or network interface 382 can allow the gNB 102 to communicate with a larger network (e.g., Internet) through a wired or wireless local area network or through a wired or wireless connection. The backhaul or network interface 382 comprises any suitable structure that supports communication through a wired or wireless connection, e.g., the Ethernet or an RF transceiver.

The memory 380 is coupled to the controller/processor 378. A part of the memory 380 can comprise an RAM, while the other part of the memory 380 can comprise a flash memory or other ROMs. In some embodiments, a plurality of instructions such as the BIS algorithm are stored in the memory. The plurality of instructions are configured to cause the controller/processor 378 to execute the BIS process and decode the received signal after at least one interference signal determined by the BIS algorithm is removed.

As described in more detailed below, the transmitting and receiving paths of the gNB 102 (implemented by using the RF transceivers 372*a* to 372*n*, the TX processing circuit 374 and/or the RX processing circuit 376) support aggregated communication with FDD cells and TDD cells.

Although FIG. 3*b* shows an example of the gNB 102, various alterations can be made to FIG. 3*b*. For example, the gNB 102 can comprise any number of each component shown in FIG. 3*a*. As a specific example, the access point can comprise many backhaul or network interfaces 382, and the controller/processor 378 can support a routing function to route data between different network addresses. As another specific example, although it is shown that the gNB comprises a single instance of the TX processing circuit 374 and a single instance of the RX processing circuit 376, the gNB 102 can comprise a plurality of instances of each of the TX processing circuit and the RX processing circuit (for example, each RF transceiver corresponds to one instance).

In order to make the objectives, technical solutions and advantages of the present disclosure clearer, the technical solutions of the present disclosure will be described in detail below by specific embodiments. The following specific embodiments can be combined with each other, and the same or similar concepts or processes may not be repeated in some embodiments.

Figure 4:
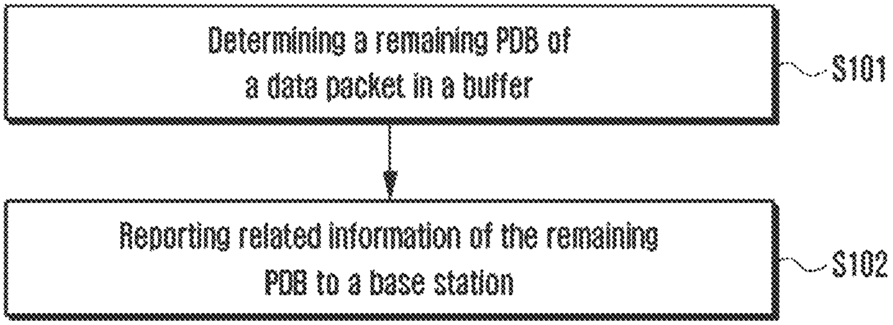
FIG. 4 is a flowchart of a communication method according to an embodiment of the present disclosure.

An embodiment of the present disclosure provides a communication method, as shown in FIG. 4, comprising the following steps.

Step S101: determining a remaining PDB of a data packet in a buffer.

Generally, for delay-sensitive services such as XR services, there will be certain transmission delay requirements. Here, the transmission delay refers to the end-to-end transmission delay, that is, it starts from the moment when the application layer data packet of the transmitter arrives to the moment when the application layer data packet of the receiver is received. Different services may have different PDB requirements.

In the embodiment of the present disclosure, the determination of the remaining PDB can be implemented by the UE. For example, the remaining PDB of a data packet in a buffer of an LCH (or LCG) is determined through signaling interaction between the application layer and the Medium Access Control (MAC) layer, or the like. It will not be limited in the embodiments of the present disclosure.

Step S102: reporting related information of the remaining PDB to a base station.

In the context, for the convenience of description, the remaining PDB may refer to the related information of the remaining PDB.

Optionally, reporting of the remaining PDB may be executed by an MAC layer of a UE.

Optionally, the remaining PDB may be relative to the reporting moment, i.e., the amount of the remaining time satisfying the PDB requirement at the reporting moment. The remaining PDB of the same data packet reported at different moments is different. The remaining PDB is the PDB requirement of the data packet minus the waiting time in the buffer. The base station should schedule the data packet within the remaining PDB to prevent this data packet from being discarded due to PDB timeout.

In this embodiment of the present disclosure, the UE reports the remaining PDB of the data packet in the buffer of the LCH (or LCG) to assist the base station to perform uplink scheduling.

In accordance with the communication method provided in this embodiment of the present disclosure, for an uplink service, the packet loss rate of data packets can be reduced, and the transmission efficiency can be improved.

An embodiment of the present disclosure provides one feasible implementation. The reporting, by the UE, related information of the remaining PDB to the base station comprises at least one of the following. That is, the UE can report the remaining PDB by using at least one of the following optional solutions.

(1) The remaining PDB value is reported to the base station.

Further, the reporting, by the UE, related information of the remaining PDB to the base station may additionally comprise at least one of the following to better assist the base station to perform unlink scheduling:

- reporting, to the base station, a size of a data packet corresponding to the remaining PDB, or a relative ratio of the size of the data packet; and
- reporting, to the base station, the ID of an LCH or an LCG to which a data packet corresponding to the remaining PDB belongs.

In the embodiment of the present disclosure, the relative ratio of the size of the data packet (the same parts below have the same meaning and will not be repeated) comprises any one of the following:

- a ratio of the size of the data packet relative to a total amount of data in all buffers;
- a ratio of the size of the data packet relative to a total amount of data in an LCG to which the data packet belongs; and
- a ratio of the size of the data packet relative to a total amount of data in an LCH to which the data packet belongs.

In the embodiment of the present disclosure, the unit remaining PDB value (reported by the UE) is millisecond. For example, the unit of the reported remaining PDB value is 1 ms, or 0.5 ms, etc. It will not be specifically limited here.

Alternatively, in the embodiment of the present disclosure, the unit of the remaining PDB value (reported by the UE) is the time slot under the reference subcarrier interval. For example, the length of one time slot under the 15 KHz subcarrier interval is 1 ms, while the length of one time slot under the 30 kHz subcarrier interval is 0.5 ms, etc. It will not be specifically limited here.

Optionally, the reference subcarrier interval comprises at least one of the following.

1. Subcarrier interval used by an uplink transmission for reporting the remaining PDB.
2. Subcarrier interval of the current uplink activated BWP.

That is, the unit of the reported remaining PDB value may be the time slot under the subcarrier interval of the current uplink activated BWP.

3. Subcarrier interval of an uplink activated BWP of a primary serving cell (Pcell) when a plurality of uplink serving cells are configured.

That is, when a plurality of serving cells are configured, the unit of the reported remaining PDB value may be time slot under the subcarrier interval of the uplink activated BWP on the primary serving cell.

4. The maximum subcarrier interval among subcarrier intervals of all uplink BWPs configured currently.

That is, the unit of the reported remaining PDB value may be the time slot under the maximum subcarrier interval among subcarrier intervals of all uplink BWPs configured currently.

5. The maximum subcarrier interval among subcarrier intervals of all uplink BWPs of all serving cells when a plurality of uplink serving cells are configured.

That is, when a plurality of serving cells are configured, the unit of the reported remaining PDB value may be the time slot under the maximum subcarrier interval among subcarrier intervals of all uplink BWPs on all serving cells.

6. Reference subcarrier interval configured by the base station.

That is, the unit of the reported remaining PDB value may be the time slot under the reference subcarrier interval configured by the base station.

7. Predetermined reference subcarrier interval.

That is, the unit of the reported remaining PDB value may be the time slot under the predefined subcarrier interval.

Alternatively, in the embodiment of the present disclosure, a range of the remaining PDB is reported to the base station.

In the embodiment of the present disclosure, in order to reduce the signaling overhead for reporting the remaining PDB, the remaining PDB value reported by the UE may be based on a range, and it is unnecessary to report the specific remaining PDB value. For example, 8 ranges of the remaining PDBs are reported by 3 bits. Table 1 shows an example of the interval indication of the remaining PDB.

TABLE 1

| Index No. | The remaining PDB value |
|---|---|
| 0 | 0 < PDB ≤ 5 |
| 1 | 5 < PDB ≤ 10 |
| 2 | 10 < PDB ≤ 15 |
| 3 | 15 < PDB ≤ 20 |
| 4 | 20 < PDB ≤ 25 |
| 5 | 25 < PDB ≤ 30 |
| 6 | 30 < PDB ≤ 35 |
| 7 | 35 < PDB |

(2) Information indicating whether the remaining PDB value is smaller than a first predetermined threshold is reported to the base station.

That is, in the embodiment of the present disclosure, the UE implicitly, but not directly, reports the value or interval of the remaining PDB. Specifically, it can be indicated by 1 bit. For example, it can be reported as 0 or 1, wherein 1 indicates that there is a data packet, having a remaining PDB with a remaining PDB value smaller than the first predetermined threshold, in the buffer, and 0 indicates that there is not a data packet, having a remaining PDB with a remaining PDB value smaller than the first predetermined threshold, in the buffer.

(3) The size of a data packet having a remaining PDB with a remaining PDB value smaller than the first predetermined threshold, or a relative ratio of the size of the data packet, is reported to the base station.

That is, in the embodiment of the present disclosure, the UE implicitly, but not directly, reports the value or interval of the remaining PDB. Specifically, it comprises at least one of the following.

1. The size of the data packets, having a remaining PDB with a remaining PDB value smaller than a predetermined threshold is reported.

For example, the UE reports a size of the data packet, having a remaining PDB with a remaining PDB value smaller than the predetermined threshold, among the data packets in the buffer. The threshold may be predefined or preconfigured.

2. The ratio of a size of the data packet, having a remaining PDB with a remaining PDB value smaller than the predetermined threshold relative to the total amount of data is reported.

For example, the UE reports the ratio of a size of the data packet, having a remaining PDB with a remaining PDB value smaller than the predetermined threshold, among the data packets in the buffer relative to the total amount of data in the corresponding buffer. The threshold may be predefined or preconfigured.

In order to save the signaling overhead, the ratio of a size of the data packet, having a remaining PDB value of the remaining PDB smaller than the predetermined threshold relative to the total amount of data in the corresponding buffer can be reported based on a range. Table 2 shows an example of the ratio interval indication. The threshold k may be predefined or preconfigured.

TABLE 2

| Index No. | The range of the ratio of a size of the data packet, having a remaining PDB value of the remaining PDB smaller than the predetermined threshold relative to the total amount of data |
|---|---|
| 0 | 1.0 |
| 1 | 0.8 ≤ ratio < 1.0 |
| 2 | 0.6 ≤ ratio < 0.8 |
| 3 | 0.4 ≤ ratio < 0.6 |
| 4 | 0.2 ≤ ratio < 0.4 |
| 5 | 0.1 ≤ ratio < 0.2 |
| 6 | 0 < ratio < 0.1 |
| 7 | 0 |

(4) The ID of the LCH or the LCG to which the data packet, having a remaining PDB with a remaining PDB value smaller than the first predetermined threshold, belongs is reported to the base station.

In the embodiment of the present disclosure, the reporting the remaining PDB value to the base station comprises at least one of the following:

1. If a data packet corresponding to the remaining PDB is sensitive to delay, the remaining PDB value is reported to the base station.

That is, in the embodiment of the present disclosure, the reporting of the remaining PDB of data packets of delay-sensitive application layer services is supported. For example, only the reporting of the remaining PDB of data packets of delay-sensitive application layer services such as XR services is supported, but the reporting of the remaining PDB of data packets of delay-insensitive application layer services is not supported. Determining whether the data packet in the buffer is sensitive to delay may be implemented by the UE.

2. If a data packet corresponding to the remaining PDB is insensitive to delay, the remaining PDB is reported to the base station as infinity.

That is, in the embodiment of the present invention, in addition to supporting the reporting of the remaining PDB of data packets of delay-sensitive application layer services, the reporting of the remaining PDB of data packets of delay-insensitive application layer services is also supported. For example, reporting the remaining PDB value as infinity indicates that the data packet is insensitive to delay, so that the packet loss rate of data packets is further reduced and the transmission efficiency is improved.

An embodiment of the present disclosure provides one possible implementation. The reporting related information of the remaining PDB to the base station comprises at least one of the following:

- reporting related information of a remaining PDB of at least one data packet in a buffer of one LCH;
- reporting related information of a remaining PDB of at least one data packet in a buffer of one LCG, the one LCG comprising a group of LCHs;
- reporting related information of a remaining PDB of at least one data packet in a buffer of all LCHs corresponding to a data radio bearer; and
- reporting related information of a remaining PDB of at least one data packet in a buffer of all LCHs.

Specifically, in one optional solution, the UE reports the remaining PDB of data packets in the buffer on the basis of one LCH. A plurality of data packets may be cached in the buffer of one LCH can cache, that is, there may be a plurality of radio link control (RCL) service data units (SDUs) in the buffer, and one data packet corresponds to one RLC SDU. The plurality of data packets may arrive at the buffer of the LCH at different moments, and may belong to different application layer services and thus have different PDB requirements. That is, the plurality of data packets may have different values of the remaining PDB. If the remaining PDB is reported on the basis of interval, the values of the remaining PDB of the plurality of data packets may in different intervals.

In another optional solution, in order to reduce the signal overhead for reporting the remaining PDB, the UE can report the remaining PDB of data packets in the buffer on the basis of an LCH group (LCG), instead of reporting one remaining PDB for each LCH. One LCG contains a plurality of LCHs, the buffer of one LCH may contain a plurality of data packets, and the plurality of data packets may have different values of the remaining PDB or intervals.

In still another optional solution, in order to further reduce the signal overhead for reporting the remaining PDB, the UE reports the remaining PDB of data packets in the buffer on the basis of all LCHs, instead of reporting one remaining PDB for each LCH or LCG. The buffers of all LCHs may contain a plurality of data packets, and the plurality of data packets may have different values of the remaining PDB or intervals.

In yet another optional solution, the UE reports the remaining PDB of data packets in the buffer on the basis of all LCHs of the corresponding data radio bearer, instead of reporting one remaining PDB for each LCH or LCG. The buffers of all LCHs of the corresponding data radio bearer may contain a plurality of data packets, and the plurality of data packets may have different values of the remaining PDB or intervals.

In the embodiment of the present disclosure, the UE can report the remaining PDBs of a plurality of data packets in buffers of one LCH, one LCG or all LCHs in at least one of the following ways. That is, if a remaining PDB value of the remaining PDB is reported to the base station, reporting the related information of the remaining PDB of at least one data packet comprises at least one of the following.

(1) The remaining PDB value of each data packet is reported to the base station.

Exemplarily, the UE reports a plurality of different values of the remaining PDB (or intervals) for the plurality of data packets. The UE can also report a size of the data packet corresponding to the plurality of different values of the remaining PDB, or a relative ratio of the size of the data packet, respectively.

(2) The values of remaining PDBs smaller than a second predetermined threshold, among remaining PDB values of various data packets are reported to the base station.

Exemplarily, the UE reports the values of remaining PDBs smaller than the second predetermined threshold, among the values of the remaining PDB (or intervals) of the plurality of data packets. The UE can also report a size of the data packet corresponding to the values of the remaining PDB (or intervals) smaller than the second predetermined threshold, or a relative ratio of a size of the data packet. The second predetermined threshold may be predefined or preconfigured.

(3) The smallest remaining PDB values among remaining PDB values of various data packets are reported to the base station.

Exemplarily, the UE reports only the smallest values (or intervals) among the values of the remaining PDB of the plurality of data packets. The UE can also report a size of the data packet corresponding to the smallest values of the remaining PDB (or intervals), or a relative ratio of the size of the data packet.

(4) The smallest remaining PDB values smaller than the second predetermined threshold, among remaining PDB values of various data packets are reported to the base station.

Exemplarily, the UE reports only the smallest values (or intervals) smaller than the second predetermined threshold, among the values of the remaining PDB of the plurality of data packets. The UE can also report a size of the data packet corresponding to the smallest values of the remaining PDB (or intervals) smaller than the second predetermined threshold, or a relative ratio of a size of the data packet.

(5) N smallest remaining PDB values among remaining PDB values of various data packets are reported to the base station.

Exemplarily, the UE report N smallest values (or intervals) among the values of the remaining PDB of the plurality of data packets, where N is a positive integer, and the value of N is predefined or preconfigured. For example, the UE reports three smallest values among the values of the remaining PDB (or intervals) of the plurality of data packets. The UE can also report a size of the data packet corresponding to the N smallest values of the remaining PDB (or intervals), or a relative ratio of the size of the data packet.

(6) N smallest remaining PDB values smaller than the second predetermined threshold, among remaining PDB values of various data packets are reported to the base station.

Exemplarily, the UE reports N smallest values (or intervals) smaller than the second predetermined threshold, among the values of the remaining PDB of the plurality of data packets, where N is a positive integer, and the value of N is predefined or preconfigured. The UE can also report a size of the data packet corresponding to the N smallest values of the remaining PDB (or intervals) smaller than the second predetermined threshold, or a relative ratio of a size of the data packet.

That is, in the embodiment of the present disclosure, after the remaining PDB value of at least one data packet is reported to the base station, the size of the data packet of the reported remaining PDB or relative thereof can also be reported to the base station.

In the embodiment of the present disclosure, before the related information of the remaining PDB is reported to the base station, the method further comprises: determining, an LCH or an LCG, which is necessary to be reported, of the remaining PDB, according to at least one of the following.

(1) an LCHs or an LCG of the Corresponding Data Radio Bearer

Optionally, the UE reports the remaining PDBs of data packets in a buffer of each LCH (or LCG). The reported LCH needs to correspond to the data radio bearers (DRB). For an LCH corresponding to a signaling radio bearer (SRB), the data packets in the buffer are control signaling of the access stratum (AS) or non-access stratum (NAS), so it is unnecessary to report the remaining PDB.

(2) an ID of an LCH or an ID of LCG Configured by the Base Station

Optionally, the UE reports the remaining PDBs of data packets in buffers of one or more preconfigured LCHs (or LCGs). That is, the LCHs (or LCGs), which are necessary to be reported, of the remaining PDB are preconfigured by the base station. For other LCHs (or LCGs), it is unnecessary to report the remaining PDB. For example, the base station configures, for each LCH (or LCG), whether it needs to report the remaining PDB, or the base station configures the IDs of LCHs (or LCGs), which are necessary to be reported, of the remaining PDB.

(3) A Predefined ID of an LCH or a Predefined ID of LCG

Optionally, the UE reports the remaining PDBs of data packets in buffers of one or more predefined LCHs (or LCGs). That is, the LCHs (or LCGs), which are necessary to be reported, of the remaining PDB are predefined. For other LCHs (or LCGs), it is unnecessary to report the remaining PDB. For example, the IDs of LCHs (or LCGs), which are necessary to be reported, of the remaining PDB are predefined.

(4) an LCH or an LCG Having a Priority Higher than a First Predetermined Priority Optionally, the UE reports of the remaining PDBs of data packets in buffers of one or more LCHs (or LCGs) having a priority higher than the first predetermined priority. That is, only the LCHs having a priority higher than the first predetermined priority, which is necessary to be reported, of the remaining PDB. The first predetermined priority may be defined or preconfigured.

In the embodiment of the present disclosure, before the related information of the remaining PDB is reported to the base station, the method further comprises: triggering the UE to report the related information of the remaining PDB to the base station by at least one of the following.

(1) Instructing Triggering by the Base Station Through a Dedicated Signaling

Specifically, the base station instructs the UE to report the remaining PDB of the data packet in the current buffer through a dedicated signaling. That is, the UE reporting the remaining PDB is triggered by the base station. The dedicated signaling may be borne by an MAC CE or by a downlink control indicator (DCI) of a physical layer. For example, by instructing the UE to report an ID of an LCH or an LCG corresponding to the remaining PDB through a dedicated signaling, the base station can trigger the UE to report the remaining PDB.

(2) Periodically Triggering According to a Predetermined Period

That is, the remaining PDB is reported periodically. The predetermined period may be predefined or preconfigured.

(3) Event Triggering Satisfying a Particular Condition

That is, the UE reporting the remaining PDB of the data packet in the buffer is event triggered. For example, when at least one of the following events occurs, the reporting of the remaining PDB is triggered. That is, event triggering comprises at least one of the following (possibly any combination).

(1) The remaining PDB is smaller than a third predetermined threshold.

For example, the (smallest) remaining PDB value of the data packet in the buffer is smaller than the third predetermined threshold.

(2) The priority of an LCH or an LCG to which a data packet corresponding to the remaining PDB belongs is higher than a second predetermined priority.

For example, the priority of the LCH to which the data packet, having the smallest remaining PDB value and/or a remaining PCB value smaller than the predetermined threshold, in the buffer is higher the second predetermined priority.

(3) The size of a data packet corresponding to the remaining PDB is greater than a fourth predetermined threshold.

For example, a size of the data packet corresponding to the smallest remaining PDB value and/or a remaining PDB value smaller than the predetermined threshold, in the buffer is greater than the fourth predetermined threshold.

(4) The data packet corresponding to the remaining PDB has a particular service attribute.

(5) A BSR is triggered, and there are data in the buffer.

There is data in the buffer, that is, the BSR is greater than 0.

Specifically, the UE reporting the remaining PDB of the data packet in the buffer of the LCH is bound with the BSR. That is, reporting the remaining PDB can be triggered only when the BSR is triggered. There is no situation where reporting the remaining PDB is triggered without triggering the BSR, but there is a case where the BSR is triggered but reporting the remaining PDB is not triggered.

In the embodiment of the present disclosure, when the BSR is triggered to trigger the UE to report the related information of the remaining PDB to the base station, the reporting the related information of the remaining PDB to the base station comprises: reporting the related information of the remaining PDB and the BSR to the base station. That is, the UE reports (the related information of) the remaining PDB and the BSR to the base station. The remaining PDB can be reported together with at least one of: the regular BSR, padding BSR and periodic BSR in the existing standards.

Specifically, the reporting the related information of the remaining PDB to the base station further comprises at least one of the following.

(1) The BSR counts the total size of all data packets in the corresponding buffer.

That is, the definition of the BSR can be the same as that in the existing standards. The BSR counts the size of all data packets in the corresponding buffer.

(2) The BSR counts a size of a data packet corresponding to the remaining PDB in the corresponding buffer.

That is, the BSR reported together with the remaining PDB only counts the size of the data packet of the reported remaining PDB.

Optionally, in the embodiment of the present disclosure, if the BSR is triggered, triggering the UE to report the related information of the remaining PDB to the base station comprises: when at least one of the following conditions is met, triggering the UE to report the related information of the remaining PDB to the base station. That is, when the BSR is triggered and at least one of the following conditions is met, reporting the remaining PDB is also triggered.

(1) The buffer size is greater than 0.

If the buffer size is greater than 0, there are data in the buffer.

(2) The data of a particular service is contained in the buffer.

For example, the particular service is an XR service sensitive to delay.

(3) The remaining PDB is smaller than a fifth predetermined threshold.

The fifth predetermined threshold may be predefined or preconfigured.

(4) The priority of an LCH or an LCG to which a data packet corresponding to the remaining PDB belongs is higher than a third predetermined priority.

The priority of the LCH or the LCG to which the corresponding data packet belongs being the third predetermined priority may mean that it is higher than a predetermined threshold.

(5) The size of a data packet corresponding to the remaining PDB is greater than a sixth predetermined threshold.

The sixth predetermined threshold may be predefined or preconfigured.

In the embodiment of the present disclosure, the reporting the related information of the remaining PDB to the base station further comprises at least one of the following.

(1) The remaining PDB is indicated by a newly defined MAC CE.

In the embodiment of the present disclosure, indicating the remaining PDB by a newly defined MAC CE comprises: indicating the related explicit or implicit information of the remaining PDB. When the BSR is triggered and if the reporting of the corresponding remaining PDB is also triggered, both a BSR MAC CE and PDB MAC CE are transmitted. When the Uplink Grant (UL grant) cannot bear the two MAC CEs simultaneously, the BSR MAC CE is firstly transmitted and the PDB MAC CE is then transmitted.

Specifically, the indicating the remaining PDB by a newly defined MAC CE comprises any one of the following:

- the newly defined MAC CE comprises indication information of the remaining PDB; and
- the newly defined MAC CE comprises indication information of the remaining PDB and indication information of the BSR.

(2) The remaining PDB is indicated by enhancing an existing BSR MAC CE.

In the embodiment of the present invention, the remaining PDB (including the BSR and the related explicit or implicit information of the remaining PDB) is indicated by enhancing an existing BSR MAC CE. When the BSR is triggered and if the reporting of the corresponding remaining PDB is also triggered, this enhanced BSR MAC CE is used. This enhanced BSR MAC CE can be distinguished from the existing BSR MAC CE by different MAC subheaders.

(3) The remaining PDB is indicated by a dedicated Scheduling Request (SR) resource.

In the embodiment of the present disclosure, it can be implicitly indicated by an SR whether there is a data packet, having a remaining PDB with a remaining PDB value smaller than the predetermined threshold, in the buffer. For example, when the UE transmits an SR to request for an uplink scheduling and if there is a data packet, having a remaining PDB with a remaining PDB value smaller than the predetermined threshold, in the buffer, the UE uses a corresponding SR resource; and, if there is not a data packet, having a remaining PDB with a remaining PDB value smaller than the predetermined threshold, in the buffer, the UE uses another corresponding SR resource. That is, the base station configures a dedicated SR resource for a case where there is a data packet, having a remaining PDB with a remaining PDB value smaller than the predetermined threshold, in the buffer. Exemplarily, the base station configures a dedicated SR resource for a case where there is a data packet, having a remaining PDB with a remaining PDB value smaller than the predetermined threshold, in the whole buffer, or the base station configures a dedicated SR resource for a case where there is a data packet, having a remaining PDB with a remaining PDB value smaller than the predetermined threshold, in the buffer of each LCG (or LCH). Alternatively, the base station configures different SR resources for different intervals of the remaining PDB, and the UE uses the corresponding SR resource according to the interval of the smallest remaining PDB value of the remaining PDB in the buffer.

Specifically, the indicating the remaining PDB by a dedicated SR resource comprises at least one of the following:

- one SR configuration corresponds to a case where a smallest remaining PDB value of remaining PDBs of data packets in all buffers is within a predetermined range;
- one SR configuration corresponds to a case where a smallest remaining PDB value of remaining PDBs of data packets in buffers of one or more LCHs is within a predetermined range;
- one SR configuration corresponds to a case where a smallest remaining PDB value of remaining PDBs of data packets in all buffers is smaller than the seventh predetermined threshold; and
- one SR configuration corresponds to a case where a smallest remaining PDB value of remaining PDBs of data packets in buffers of one or more LCHs is smaller than the seventh predetermined threshold;
- wherein the one SR configuration comprises a group of PUCCH resources on different BWPs.

In the embodiment of the present disclosure, the indicating the remaining PDB by enhancing an existing BSR MAC CE comprises:

- remaining load bits of the existing BSR MAC CE unchanged, and using 1 bit in the existing Buffer Size indication field to indicate whether there is a data packet, having a remaining PDB with a remaining PDB value smaller than a seventh predetermined threshold, in the corresponding buffer, the 1 bit being a highest-order bit or a lowest-order bit of the Buffer Size indication field.

Further, if the 1 bit indicates that there is a data packet, having a remaining PDB with a remaining PDB value smaller than the seventh predetermined threshold, in the corresponding buffer, other bits of the Buffer Size indication field other than the 1 bit indicate a size of the data packet, having a remaining PDB value of the remaining PDB smaller than the seventh predetermined threshold, in the corresponding buffer.

Alternatively, if the 1 bit indicates that there is not a data packet, having a remaining PDB with a remaining PDB value smaller than the seventh predetermined threshold, in the corresponding buffer, other bits of the Buffer Size indication field other than the 1 bit indicate a total amount of data of all data packets in the corresponding buffer.

Figure 5:
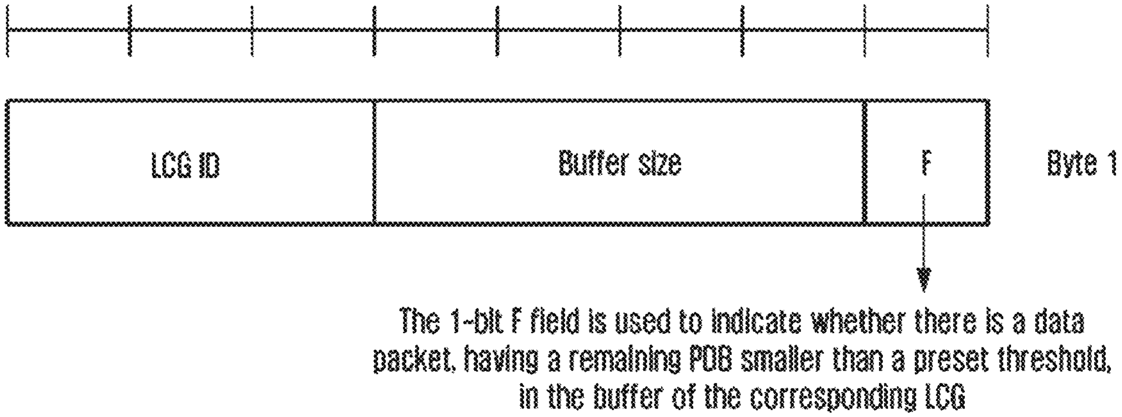
FIG. 5 is a first example diagram of indication information according to an embodiment of the present disclosure.

In the embodiment of the present invention, it is indicated by 1 bit whether there is a data packet, having a remaining PDB with a remaining PDB value smaller than the predetermined threshold, in the buffer of one LCG of the UE, but the size of the corresponding data packets is not indicated. The 1 bit can be borne by a BSR MAC CE. For example, the 1-bit information is carried by enhancing an existing BSR MAC CE format. For the Short BSR and Short truncated BSR formats, the existing 5-bit Buffer Size field used for indicating the amount of data in the buffer is reduced to 4 bits. That is, a Buffer Size quantification table containing 64 quantification classes is newly defined. The saved 1 bit is used to indicate whether there is a data packet, having a remaining PDB with a remaining PDB value smaller than the predetermined threshold value, in the buffer of the corresponding LCG, as shown in FIG. 5.

Figure 6:
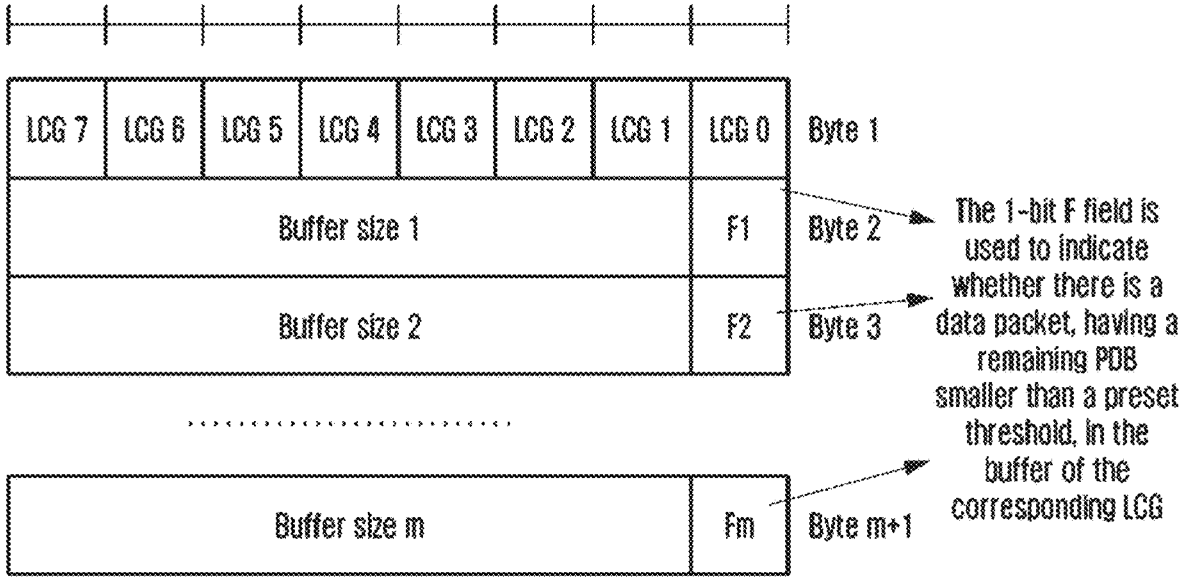
FIG. 6 is a second example diagram of indication information according to an embodiment of the present disclosure.

Similarly, for the long BSR or Long truncated BSR formats, the existing 8-bit Buffer Size field used for indicating the amount of data in the buffer is reduced to 7 bits, and the saved 1 bit is used to indicate whether there is a data packet, having a remaining PDB with a remaining PDB value smaller than the predetermined threshold, in the buffer of the corresponding LCG, as shown in FIG. 6. This enhanced Buffer Size format can only be used for predefined or preconfigured LCGs.

For the 4-bit Buffer Size of the enhanced Short BSR and Short truncated BSR formats and the 7-bit Buffer Size of the enhanced Short BSR and Short truncated BSR formats, in an example, the Buffer Size counts the total size of all data packets in the buffer of the corresponding LCG. In another example, if 1 bit indicates that there is a data packet, having a remaining PDB with a remaining PDB value smaller than the predetermined threshold, in the buffer of the corresponding LCG, the Buffer Size counts a size of the data packet, having a remaining PDB value of the remaining PDB smaller than the predetermined threshold.

In the embodiment of the present disclosure, it is also possible to indicate by 1 bit whether there is a data packet, having a remaining PDB with a remaining PDB value smaller than the predetermined threshold, in the buffer of one LCH of the UE. The 1 bit can be borne by an MAC CE. For example, one MAC CE contains the indication information of respective 1 bit of all LCHs, or one MAC CE contains the indication information of respective 1 bit of a plurality of preconfigured LCHs.

In the embodiment of the present disclosure, the UE reports the remaining PDB by the newly defined MAC CE, and the newly defined MAC CE comprises at least one of the following.

(1) An MAC CE containing at least one of: a smallest remaining PDB value of remaining PDBs of data packets in all buffers, a size of the data packet corresponding to a smallest remaining PDB value of remaining PDBs of data packets in all buffers, or a relative ratio of the size of the data packet, and an ID of an LCH or an LCG to which a data packet corresponding to a smallest remaining PDB value of remaining PDBs of data packets in all buffers belongs.

Figure 7:
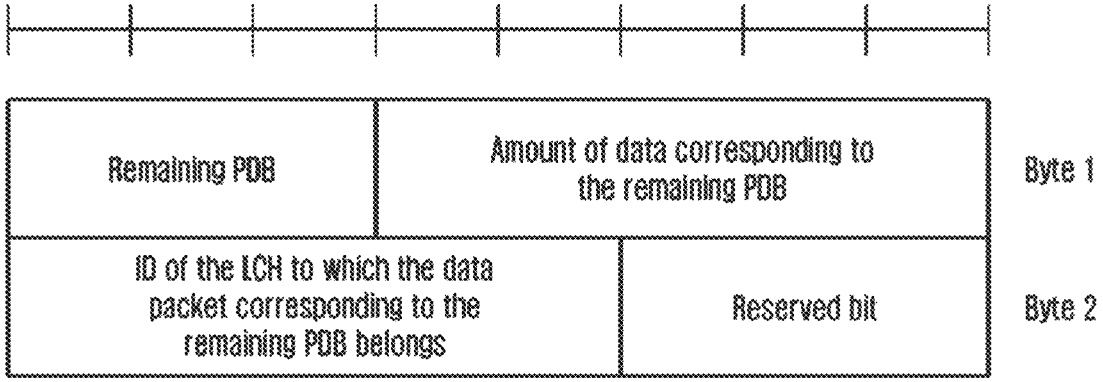
FIG. 7 is a first example diagram of reporting information according to an embodiment of the present disclosure.

Specifically, as shown in FIG. 7, one MAC CE contains at least one of: the remaining PDB of data packets in the whole buffer (Remaining PDB), the amount of data corresponding to the remaining PDB (Buffer Size associated to reported remaining PDB) and the ID of the LCH to which a data packet corresponding to the remaining PDB (LCH ID associated to reported remaining PDB).

Here, if the buffer contains a plurality of data packets and the respective values of the remaining PDB are different, Remaining PDB may be the smaller value (or interval) among the values of the remaining PDB of the data packets in the whole buffer.

If there are a plurality of data packets corresponding to the reported remaining PDB and the data packets belong to different LCHs, the amount of data of the LCH having the highest priority is used as the Buffer size associated to reported remaining PDB. If there are a plurality of data packets corresponding to the reported remaining PDB, and the plurality of data packets belong to a same LCH or the LCHs to which the plurality of data packets belong have the same priority, the total amount of data of these data packets is used as the Buffer size associated to reported remaining PDB.

In an extended embodiment of the method, in order to save the signaling overhead, the amount of data corresponding to the reported remaining PDB can also be replaced with the ratio relative to the total amount of data of the LCG. That is, an indication field of Buffer size associated to reported remaining PDB can also be replaced with an indication field of Ratio of Buffer size associated to reported remaining PDB.

If there are a plurality of data packets corresponding to the reported remaining PDB, the ID of the LCH having the highest priority is used as the LCH ID associated to reported remaining PDB.

In an extended embodiment of the method, in order to save the signaling overhead, the ID of the LCH to which a data packet corresponding to the reported remaining PDB belongs can also be replaced with the ID of the LCG to which the data packet belongs. That is, the indication field LCH ID associated to reported remaining PDB can also be replaced with the indication field LCG ID associated to reported remaining PDB.

Figure 8:
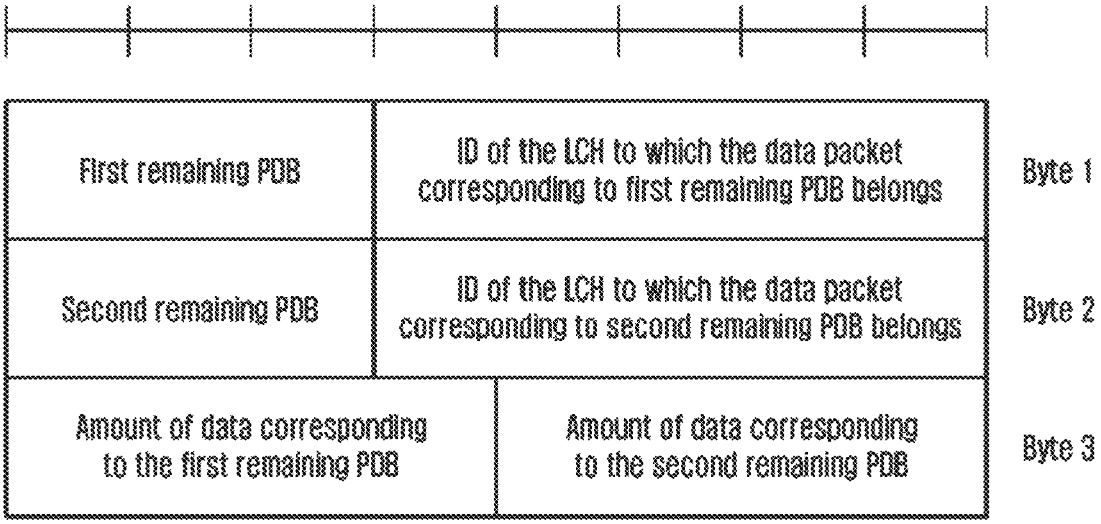
FIG. 8 is a second example diagram of reporting information according to an embodiment of the present disclosure.

Alternatively, as shown in FIG. 8, one MAC CE contains at least one of: the first remaining PDB of a data packet in the whole buffer (First remaining PDB), the amount of data corresponding to the first remaining PDB (Buffer size associated to reported first remaining PDB), the ID of an LCH to which a data packet corresponding to the first remaining PDB belongs (LCH ID associated to reported first remaining PDB), the second remaining PDB of a data packet in the whole buffer (Second remaining PDB), the amount of data corresponding to the second remaining PDB (Buffer size associated to reported second remaining PDB) and the ID of an LCH to which a data packet corresponding to the second remaining PDB belongs (LCH ID associated to reported second remaining PDB).

Here, the first remaining PDB may be the smallest value (or interval) among the remaining PDBs of data packets in the whole buffer, and the second remaining PDB may be the second smallest value (or interval) among the remaining PDBs of data packets in the whole buffer.

Similarly, in one extended embodiment of the method, the LCH ID associated to reported first/second remaining PDB can also be replaced with the LCG ID associated to reported first/second remaining PDB; and/or, the Buffer size associated to reported first/second remaining PDB can also be replaced with the Ratio of Buffer size associated to reported first/second remaining PDB.

(2) An MAC CE containing at least one of: a size of the data packet, having a remaining PDB with a remaining PDB value smaller than an eighth predetermined threshold, of data packets in all buffers, or a relative ratio of the size of the data packet, and an ID of an LCH or an LCG to which the data packet, having a remaining PDB with a remaining PDB value smaller than the eighth predetermined threshold, belongs.

Figure 9:
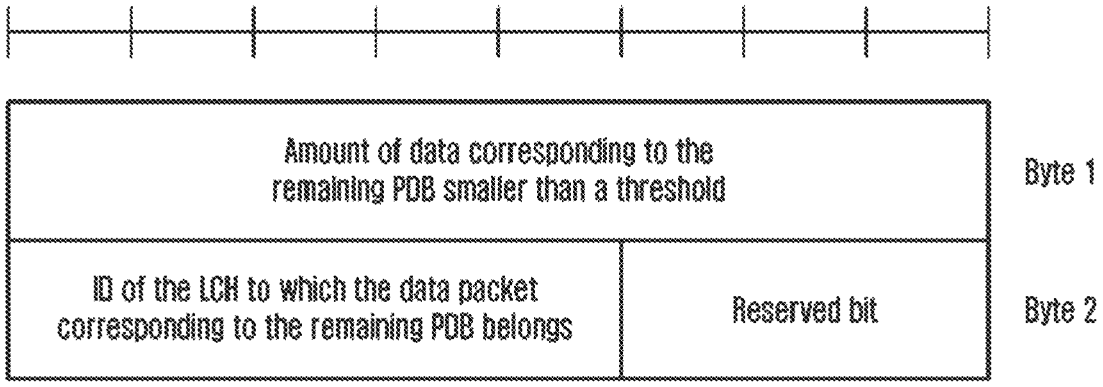
FIG. 9 is a third example diagram of reporting information according to an embodiment of the present disclosure.

Specifically, as shown in FIG. 9, one MAC CE contains the amount of data of data packets, having a remaining PDB with a remaining PDB value smaller than a threshold (i.e., the eighth predetermined threshold) in the whole buffer (Buffer size associated to a remaining PDB smaller than a threshold) and the ID of the LCH to which the corresponding data packet belongs (LCH ID associated to a remaining PDB smaller than a threshold).

Here, the threshold for the remaining PDB may be predefined or preconfigured. For example, the threshold is predefined as a fixed value, or preconfigured by the base station through an RRC signaling. If the remaining PDBs of a plurality of data packets are smaller than the threshold and the plurality of data packets belong to different LCHs, the ID of the LCH having the highest priority among the LCHs to which the data packets belong is used as the LCH ID associated to a remaining PDB smaller than a threshold, and the amount of data of the LCH having the highest priority among the LCHs to which the data packets belong is used as the Buffer size associated to a remaining PDB smaller than a threshold.

Similarly, in one extended embodiment of the method, the LCH ID associated to a remaining PDB smaller than a threshold can also be replaced with the LCG ID associated to a remaining PDB smaller than a threshold; and/or, the Buffer size associated to a remaining PDB smaller than a threshold can also be replaced with the Ratio of Buffer size associated to a remaining PDB smaller than a threshold.

(3) An MAC CE containing at least one of: an ID of one LCH or one LCG, a smallest remaining PDB value of remaining PDBs of data packets in a buffer of the one LCH or the one LCG, and a size of the data packet corresponding to a smallest remaining PDB value of remaining PDBs of data packets in a buffer of the one LCH or the one LCG, or a relative ratio of the size of the data packet.

Figure 10:
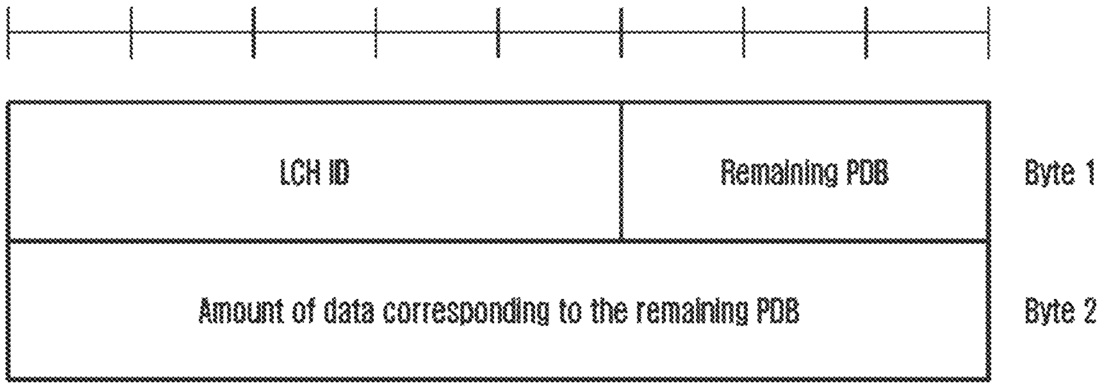
FIG. 10 is a fourth example diagram of reporting information according to an embodiment of the present disclosure.

Specifically, as shown in FIG. 10, one MAC CE contains at least one of: the ID of one LCH (LCH ID), the remaining PDB of data packets in the buffer of the LCH (Remaining PDB) and the amount of data corresponding to the remaining PDB (Buffer size associated to reported remaining PDB).

Here, if a plurality of data packets are contained in the buffer of the LCH and the respective remaining PDBs are different, the smallest value (or interval) among the remaining PDBs of the plurality of data packets is used as the reported Remaining PDB.

As described above, in one extended embodiment of the method, the LCH ID can be replaced with the LCG ID. That is, one MAC CE may contain at least one of: the ID of one LCG (LCG ID), the remaining PDB of data packets in the buffer of the LCG (Remaining PDB) and the amount of data corresponding to the remaining PDB (Buffer size associated to reported remaining PDB).

As described above, in one extended embodiment of the method, the Buffer size associated to reported remaining PDB can also be replaced with the Ratio of Buffer size associated to reported remaining PDB, i.e., the ratio of the amount of data corresponding to the remaining PDB relative to the total amount of data in the buffer of the LCG to which it belongs.

(4) An MAC CE containing at least one of: an ID of one LCH or one LCG, and a size of the data packet, having a remaining PDB with a remaining PDB value smaller than the eighth predetermined threshold, in a buffer of the one LCH or the one LCG, or a relative ratio of the size of the data packet.

In an extended embodiment of the method of (3), the MAC CE does not directly indicate the remaining PDB. That is, it only contains the LCH ID field (or LCG ID field) and the amount of data of data packets, having a remaining PDB with a remaining PDB value smaller than the predetermined threshold, in the buffer of the LCH (or LCG), or a relative ratio of the amount of the data of the data packets (Buffer size associated to a remaining PDB smaller than a threshold).

(5) An MAC CE containing at least one of: an ID of one LCH or one LCG, the total amount of data in a buffer of the one LCH or the one LCG, a smallest remaining PDB value of remaining PDBs of data packets in buffers of the one LCH or the one LCG, and a size of the data packet corresponding to a smallest remaining PDB value of remaining PDBs of data packets in buffers of the one LCH or the one LCG, or a relative ratio of the size of the data packet.

Specifically, as shown in FIG. 11, one MAC CE contains at least one of: the ID of one LCG (LCG ID), the total amount of data of the buffer of the LCG (Buffer size), the remaining PDB of data packets in the buffer of the LCG (Remaining PDB) and the ratio of the amount of data corresponding to the remaining PDB relative to the total amount of data (Ratio of buffer size associated to reported remaining PDB). This MAC CE is the enhancement of Short BSR MAC CE and Short truncated BSR MAC CE in the existing standards. That is, for an LCG, the BSR and the Remaining PDB are jointly reported.

Here, if a plurality of data packets are contained in the buffer of the LCH and the respective remaining PDBs are different, the smallest value (or interval) among the remaining PDBs of the plurality of data packets is used as the reported Remaining PDB.

(6) An MAC CE containing at least one of: an ID of one LCH or one LCG, the total amount of data in a buffer of the one LCH or the one LCG and a size of the data packet, having a remaining PDB with a remaining PDB value smaller than the eighth predetermined threshold, in a buffer of the one LCH or the one LCG, or a relative ratio of the size of the data packet.

In an extended embodiment of the method of (5), the MAC CE does not directly indicate the remaining PDB. That is, it only contains the LCG ID field, a size of the data packet in the buffer of the LCG and the amount of data of data packets, having a remaining PDB with a remaining PDB value smaller than the predetermined threshold, in the buffer of the LCG, or a relative ratio of the amount of the data of the data packets (Buffer size associated to a remaining PDB smaller than a threshold).

(7) An MAC CE containing at least one of: the amount of data in respective buffers of a plurality of LCGs, a smallest remaining PDB value of remaining PDBs of data packets in respective buffers of the plurality of LCGs, and a size of the data packet corresponding to the plurality of remaining PDBs, or a relative ratio of the size of the data packet.

Figure 12:
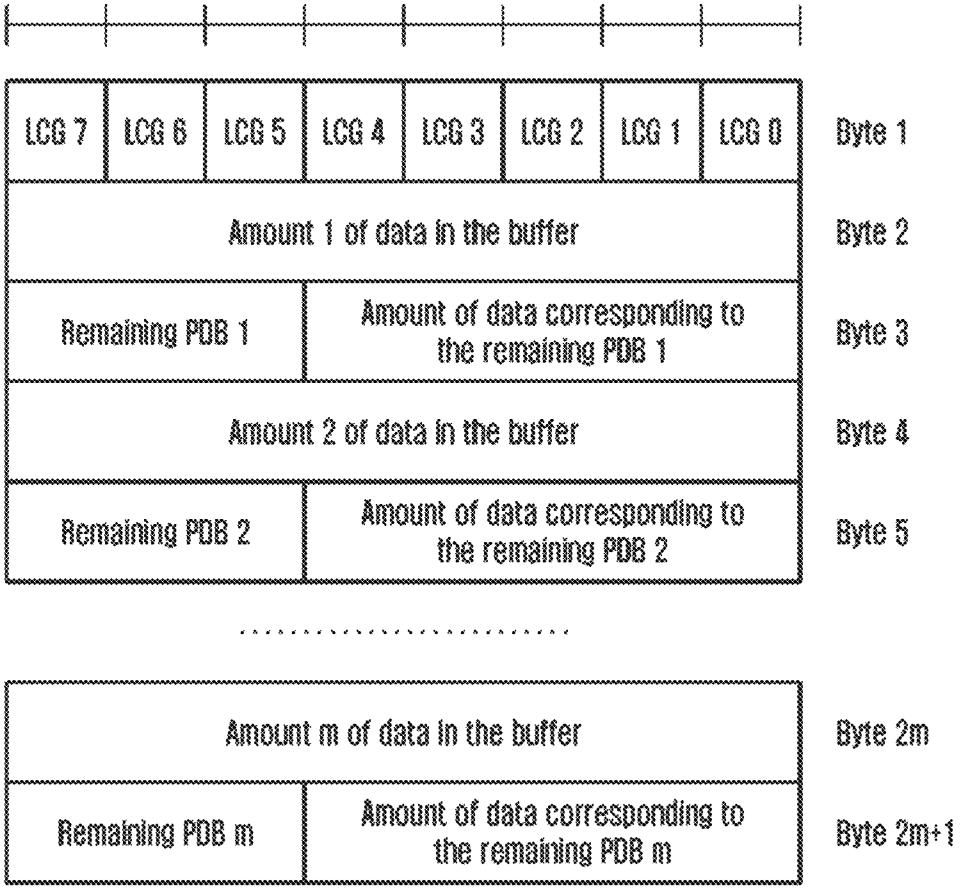
FIG. 12 is a sixth example diagram of reporting information according to an embodiment of the present disclosure.

Specifically, as shown in FIG. 12, one MAC CE contains the amount of data in buffers of a plurality of LCGs, the remaining PDBs of data packets in respective buffers of the plurality of LCGs, and the ratio of the amount of data corresponding to the plurality of PDBs relative to the total amount of data of the LCG to which the data packets belong. For example, it specifically contains 8 LCGi fields, m Buffer Size fields, m Remaining PDB fields, and m Ratio of buffer size associated to reported remaining PDB fields. This MAC CE is the enhancement of Long BSR MAC CE and Long truncated BSR MAC CE in the existing standards. That is, for a plurality of LCGs, the respective BSR and Remaining PDB are jointly reported.

The indication bit of the LCGi field being 1 indicates that the amount of data in the buffer of the LCG having an ID of i and remaining PDB are reported. As a Long BSR format, the indication bit of the LCGi field being 0 indicates that the amount of data in the buffer of the LCG having an ID of i and the remaining PDB are not reported. As a Long truncated BSR format, the indication bit of the LCGi field being 0 indicates that there is no data in the buffer of the LCG having an ID of i. The load bits of this MAC CE format are variable, depending on the number of LCGi fields having an indication bit of 1.

The Buffer Size m field, the Remaining PDB m field and the Ratio of buffer size associated to reported remaining PDB m field indicate the amount of data in the buffer corresponding to the mth LCGi having an indication bit of 1, the remaining PDB, and the ratio of the amount of data corresponding to the reported remaining PDB relative to the total amount of data of this LCGi, respectively.

Here, if a plurality of data packets are contained in the buffer of the LCH and the respective remaining PDBs are different, the smallest value (or interval) among the remaining PDBs of the plurality of data packets is used as the reported Remaining PDB.

(8) An MAC CE containing at least one of: the amount of data in respective buffers of a plurality of LCGs and a size of the data packet, having a remaining PDB with a remaining PDB value smaller than the eighth predetermined threshold, in respective buffers of the plurality of LCGs, or a relative ratio of the size of the data packet.

In an extended embodiment of the method of (7), the MAC CE does not directly indicate the remaining PDB. That is, it only contains the LCG ID field, a size of the data packet in the buffer of the LCG and the amount of data of data packets, having a remaining PDB with a remaining PDB value smaller than the predetermined threshold, in the buffer of the LCG, or a relative ratio of the size of the data packet (Buffer size associated to a remaining PDB smaller than a threshold).

(9) An MAC CE containing at least one of: the amount of data in respective buffers of a plurality of LCGs, a smallest remaining PDB value of remaining PDBs of data packets in respective buffers of the plurality of LCGs, and a size of the data packet corresponding to a smallest remaining PDB value of remaining PDBs of data packets in all buffers of the plurality of LCGs, or a relative ratio of the size of the data packet.

Figure 13:
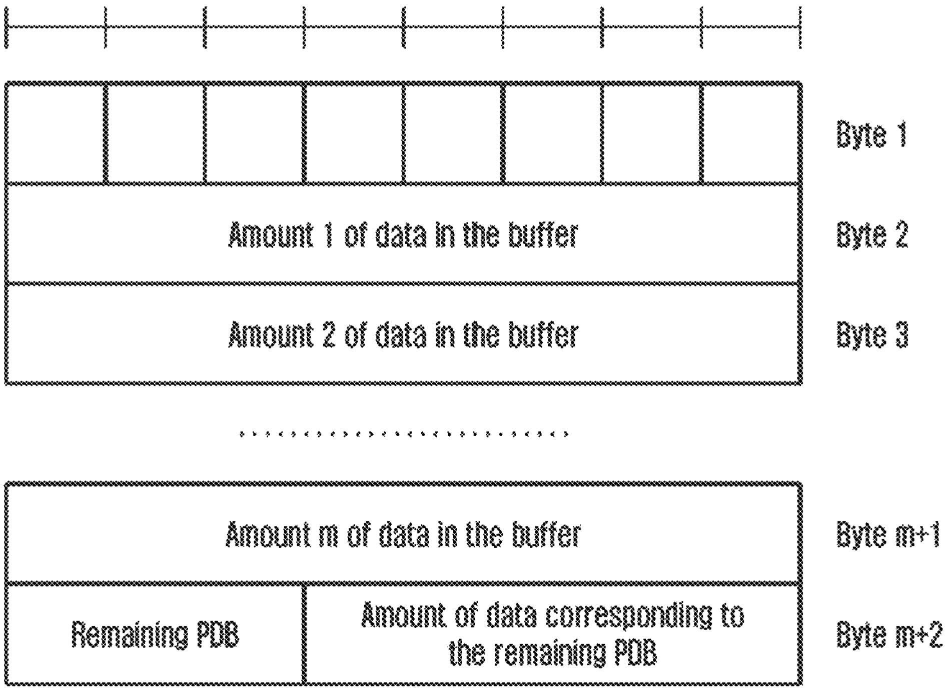
FIG. 13 is a seventh example diagram of reporting information according to an embodiment of the present disclosure.

Specifically, as shown in FIG. 13, one MAC CE contains the amount of data in buffers of a plurality of LCGs, the remaining PDB of data packets in respective buffers of the plurality of LCGs, the reported remaining PDB of data packets in all LCGs, and the amount of data corresponding to the remaining PDB. Specifically, it contains 8 LCGi fields, m Buffer Size fields, 1 Remaining PDB field and 1 Buffer size associated to reported remaining PDB field.

Each indication field has the same meaning as the above MAC CE, but mainly differs from the MAC CE in that the remaining PDB here is based on all LCGs that report the amount of cached data. If a plurality of data packets are contained in the buffers of these LCGs and the respective remaining PDBs are different, the smallest value (or interval) among the remaining PDBs of the plurality of data packets is used as the reported Remaining PDB.

In an extended embodiment of the method, the Buffer size associated to reported remaining PDB can also be replaced with the Ratio of buffer size associated to reported remaining PDB, i.e., the ratio of the reported amount of data corresponding to the remaining PDB relative to the reported total amount of data in the buffers of all LCGs.

(10) An MAC CE containing at least one of: the amount of data in respective buffers of a plurality of LCGs and a size of the data packet, having a remaining PDB with a remaining PDB value smaller than the eighth predetermined threshold, in all buffers of the plurality of LCGs, or a relative ratio of the size of the data packet.

In an extended embodiment of the method of (9), the MAC CE does not directly indicate the remaining PDB. That is, it only contains the LCG ID field, a size of the data packet in the buffer of the LCG and the amount of data of data packets, having a remaining PDB with a remaining PDB value smaller than the predetermined threshold, in the buffer of the LCG, or a relative ratio of the amount of the data of the data packets (Buffer size associated to a remaining PDB smaller than a threshold).

In the embodiment of the present disclosure, the UE can also report, to the base station, at least one of: the service type of data packets, the PDB requirement, the moment when the buffer is reached, the waiting time in the buffer or the expiration moment of the PDB.

Specifically, the UE reports the type of the application layer service to the base station, and the base station can know the PDB requirement of the service according to the type of the application layer service; or, the UE directly reports the PDB requirement of the application layer service to the base station. The UE can report the arrival moment of the data packet of the application layer service to the base station, and the base station can know the expiration moment of the PDB of the data packet according to the arrival moment of the data packet and the PDB requirement, so that the UE is scheduled before the expiration of the PDB as far as possible; or, the UE reports the waiting time of the data packet of the application layer service in the buffer to the base station, and the base station can know the expiration moment of the PDB of the data packet according to the waiting time of the data packet and the PDB requirement, so that the UE is scheduled before the expiration of the PDB as far as possible.

In the embodiment of the present disclosure, the UE can report the expiration moment of the PDB of the delay-sensitive data packet, to assist the base station to schedule this UE before the expiration of the PDB as far as possible. For example, the absolute point in time of the expiration moment of the PDB is reported, or the relative time of the expiration moment of the PDB is reported. That is, the offset of the expiration moment of the PDB relative to one reference point in time is reported.

In the embodiment of the present disclosure, for delay-insensitive services, such as some background services, the PDB requirement will not be specifically limited.

In accordance with the communication method provided in the embodiment of the present disclosure, the User Equipment determines and reports of the remaining PDB of a data packet in a buffer of an LCH to the base station, so as to assist the base station to perform proper uplink scheduling for the UE within the remaining PDB as far as possible. Accordingly, the packet loss rate of data packets is reduced, and the transmission efficiency is improved.

Figure 14:
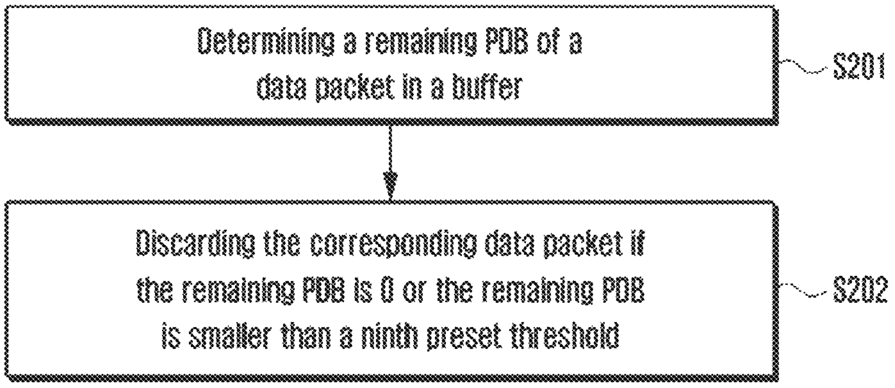
FIG. 14 is a flowchart of still another communication method according to an embodiment of the present disclosure.

An embodiment of the present disclosure further provides a communication method, as shown in FIG. 14, comprising the following steps.

Step S201: determining a remaining PDB of a data packet in a buffer.

In the embodiment of the present disclosure, the determination of the remaining PDB may be implemented by the UE. It will not be limited in the embodiment of the present disclosure.

Step S202: discarding a corresponding data packet if a remaining PDB value of the remaining PDB is 0 or the remaining PDB value is smaller than a ninth predetermined threshold.

The end-to-end transmission delay should not exceed the PDB. The data packet having a transmission delay exceeding the PDB is meaningless for the receiver and can be discarded by the transmitter.

Specifically, the MAC layer of the UE can discard the data packet with PDB timeout in the buffer. Here, the data packet belongs to a delay-sensitive service. If a data packet belongs to a delay-insensitive service, the data packet will not be discarded even of the PDB times out. Determining whether the PDB of a data packet times out and whether a data packet is discarded may be implemented by the UE.

For example, if the waiting time of an RLC SDU (or a SDU having some data already transmitted or an RLC PDU to be retransmitted) in the buffer exceeds the PDB required by the service of this data packet, the UE can discard the RLC SDU; or, if the remaining PDB of an RLC SDU (or a SDU with some data already transmitted or an RLC PDU to be retransmitted) is smaller than a predetermined threshold (ninth predetermined threshold) so that it is too late to be scheduled before PDB timeout, the UE can discard this RCL SDU.

In the embodiment of the present disclosure, the discarding a corresponding data packet specifically comprises: discarding a corresponding data packet when at least one of the following conditions is met:

- a size of a data packet corresponding to the remaining PDB is greater than a tenth predetermined threshold; and
- a priority of an LCH or an LCG to which a data packet corresponding to the remaining PDB belongs is higher than a fourth predetermined priority.

In the embodiment of the present disclosure, the UE can check whether the PDB of the data packet in the buffer times out (the remaining PDB is 0) or is insufficient (a remaining PDB value of a remaining PDB is smaller than the ninth predetermined threshold), in each Transport Time Interval (TTI). If there is a data packet with PDB timeout, the corresponding RLC SDU is discarded. Alternatively, how often the UE checks whether the PDB of the data packet in the buffer times our or is insufficient may be implemented by the UE. That is, the time when the UE discards the data packet with PDB timeout may be implemented by the UE.

In the embodiment of the present disclosure, the UE discards only data packets (i.e., RLC SDUs) with PDB timeout in buffers of predefined or preconfigured LCHs (or LCGs), but does not discard data packets (i.e., RLC SDUs) with PDB timeout in buffers of other LCHs (or LCGs). Thus, before the remaining PDB of the data packet in the buffer is determined, an LCH or an LCG in which the data packet can be discarded can be determined according to at least one of the following.

(1) LCH IDs or LCGs configured by the base station

That is, the IDs of LCHs (or LCGs) to which data packets with PDB timeout, which can be discarded by the UE, belong are preconfigured by the base station.

(2) Predefined LCH IDs or LCGs (3) an LCH or an LCG having a priority lower than a fifth predetermined priority That is, only the data packets (i.e., RLC SDUs) with PDB timeout in a buffer of an LCH having a priority lower than a predetermined threshold (fifth predetermined priority) can be discarded.

In other embodiments, it is possible that only the data packets (i.e., RLC SDUs) with PDB timeout in a buffer of an LCH having a priority lower than a predetermined threshold (sixth predetermined priority) can be discarded.

In the embodiment of the present disclosure, after discarding the corresponding data packet, the method may further comprise: triggering a BSR. Specifically, after the UE discards the data packet with PDB timeout, since the amount of data in the buffer is changed, the UE needs to trigger a Regular BSR, i.e., reporting the updated BSR. The way of reporting the BSR is the same as that in the existing standards and will not be limited here.

In the embodiment of the present disclosure, a trigger condition for the Regular BSR can be newly added. For example, if the predetermined trigger condition is met, the UE triggers the Regular BSR after discarding the data packet with PDB timeout. Optionally, triggering a BSR comprises: triggering a BSR when at least one of the following conditions is met.

(1) The amount of data of the discarded data packet exceeds an eleventh predetermined threshold.

For example, the amount of data of the RLC SDU discarded by the UE exceeds the predetermined threshold.

(2) The remaining amount of data in the current buffer is smaller than a twelfth predetermined threshold (value).

(3) The LCH to which the discarded data packet belongs is an LCH having the highest priority among all LCHs that have cached data currently.

For example, the LCH to which the RLC SDU discarded by the UE belongs is an LCH having the highest priority among all LCHs that have cached data currently.

(4) The priority of the LCH to which the discarded data packet belongs is higher than a seventh predetermined priority.

For example, the priority of the LCH to which the RLC SDU discarded by the UE belongs is higher than the predetermined priority (seventh predetermined priority).

In the embodiment of the present disclosure, for the step S202, if the PDB of data contained in an MAC PDU in a buffer of an HARQ process times out or the remaining PDB value is smaller than a thirteenth predetermined threshold, and the MAC PDU does not contain (any) MAC CE or does not contain a predetermined MAC CE, the UE can discard the MAC PDU in the buffer of this HARQ process.

Further, after the corresponding data packet is discarded and if a retransmission scheduling of this HARQ process is received, the method further comprises at least one of the following: skipping this retransmission scheduling; and, recombining a new MAC PDU for transmission on a resource of the retransmission scheduling, and reporting the base station that the transmitted MAC PDU is the new MAC PDU through an explicit or implicit signaling. That is, if the transmission scheduling of the HARQ process is received after the MAC PDU is discarded, the UE can skip the transmission scheduling, or the UE recombines a new MAC PDU for transmission on a resource of the retransmission scheduling and reports, through an explicit or implicit signaling, the base station that it is a new transport block (i.e., new MAC PDU).

In the embodiment of the present disclosure, the discarding a corresponding data packet may specifically comprise: discarding a corresponding data packet according to an indication of a dedicated signaling for discarding the data packet issued by the base station. That is, the base station instructs, through a dedicated signaling, the UE to discard the data packet having PDB timeout or a remaining PDB smaller than the predetermined threshold, in the buffer. The dedicated signaling may be borne by an MAC CE or DCI. For example, the base station instructs, through a dedicated signaling, the UE to discard an PDC SDU having PDB timeout or a remaining PDB value smaller than the predetermined threshold, in a buffer of a certain LCH (or LCG); or, the base station instructs, through a dedicated signaling, the UE to discard an MAC PDU having PDB timeout or a remaining PDB value smaller than the predetermined threshold, in a buffer of a certain HARQ process.

In accordance with the communication method provided in this embodiment of the present disclosure, the data packets exceeding the delay budge are discarded by the transmitter, so that the resources can be saved.

Figure 15:
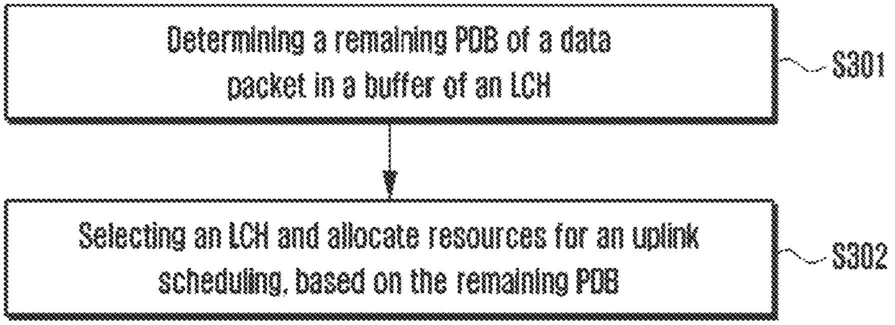
FIG. 15 is a flowchart of yet another communication method according to an embodiment of the present disclosure.

An embodiment of the present disclosure further provides a communication method, as shown in FIG. 15, comprising the following steps.

Step S301: determining a remaining PDB of a data packet in a buffer of an LCH.

The determination of the remaining PDB of a data packet may be implemented by the UE.

Step S302: selecting an LCH and allocating resources for an uplink scheduling, based on the remaining PDB.

In the existing system, for a UL grant of a New transmission, the UE needs to multiplex the data (MAC SDU) of a plurality of LCHs as an MAC PDU, and the UE selects an LCH on the basis of the priorities of the LCHs. The base station preconfigures a priority for each LCH. The smaller the value is, the higher the priority is. In order to avoid that an LCH with a higher priority always occupy bit resources of the UL grant and the data of an LCH with a lower priority cannot be transmitted, the bit resources of the UL grant should also be allocated for the selected LCH on the basis of the PBR, which is also called the allocation of resources for the LCH. The selection and resource allocation process of the LCH generally comprises the following subprocesses.

1. The UE firstly selects an LCH having the highest priority among the LCHs having cached data. After the resources allocated for the LCH reach the PBR preconfigured for the LCH, if there are still remaining resources for the UL grant, an LCH with a next highest priority is selected, and so on.
2. After the PDB of all LCHs having cached data is met, if there are still remaining resources for the UL grant, the remaining resources are firstly allocated to the LCH having the highest priority, and an LCH with a next highest priority can be served only when all data in the LCH having the highest priority is transmitted and the UL grant is not exhausted. That is, the UE maximizes the data transmission of the LCH having a higher priority.

In the embodiment of the present disclosure, in the existing LCH selection and UL grant resource allocation process, considering the remaining PDB of the data packet, the delay-sensitive data packet can be prevented from being discarded due to PDB timeout, and the packet loss rate can be reduced.

Specifically, in the step S302, for a UL grant of a New transmission, when the UE selects an LCH and allocates resources of the UL grant for each LCH, the remaining PDB of the data packet in the buffer of the LCH is also taken into consideration in addition to the priority and PBR of the LCH.

In the embodiment of the present disclosure, LCH selection and resource allocation (Logical Channel selection and resource allocation) can be performed for a UL grant based on the remaining PDB by at least one of the following optional solutions.

(1) For one selected LCH, if a plurality of data packets are contained in a buffer of the LCH and the plurality of data packets correspond to different remaining PDBs, resources are firstly allocated to a data packet, having a smallest remaining PDB value and/or a remaining PDB value smaller than a fourteenth predetermined threshold, in the buffer of the LCH; and, if there are a plurality of data packets, having the smallest remaining PDB value and/or the remaining PDB value smaller than the fourteenth predetermined threshold, resources are firstly allocated to a data packet with a shortest arrival time among the plurality of data packets.

That is, for the same LCH, if a plurality of data packets (a plurality of RLC SDUs) are contained in the buffer of the UE and the plurality of data packets have different values of the remaining PDB, the UE firstly allocates resources to a data packet, having a smallest remaining PDB value, or UE firstly allocates resources to a data packet, having a smallest remaining PDB value or a remaining PDB value smaller than the predetermined threshold, instead of firstly allocating resources of a data packet with a shortest arrival time; and, if there are a plurality of data packets corresponding to the smallest remaining PDB value, resources are firstly allocated to the data packet with a shortest arrival time until the PBR of the LCH is met or until the data packet, having a smallest remaining PDB value and/or a remaining PDB value smaller than the predetermined threshold are allocated.

(2) For two LCHs with the same priority, if data packets in buffers of the two LCHs have different remaining PDBs, resources are firstly allocated to data packets in a buffer of the first LCH with a smaller remaining PDB value, and resources are then allocated to data packets in a buffer of the other second LCH after the PBR of the first LCH is met; or, if the PBR of the first LCH is not yet met after resources are allocated to the data packets with the smaller remaining PDB value of the remaining PDB in the buffer of the first LCH, the following processes is repeated until the PBR of each LCH is met: comparing sizes of remaining PDBs of remaining data packets in the buffers of the two LCHs, and allocating resources to data packets in a buffer of one LCH with a smaller remaining PDB value.

That is, for two LCHs with the same priority, if the data packets in buffers of the two LCHs have different (smallest) remaining PDBs, the LCH with a smaller (smallest) remaining PDB value is firstly selected for serving, and the other LCH is selected for serving after the PBR of the LCH is met; or, if the PBR of the LCH is not yet met after the data packets, having a smaller (smallest) remaining PDB value are allocated, one LCH is selected for serving again according to the comparison of the (smallest) values of the remaining PDB of remaining data packets in the buffers of the two LCHs, and so on until the PBR of each LCH is met.

(3) For two LCHs with different priorities, if data packets in a buffer of a LCH with a higher priority have a greater remaining PDB value of the remaining PDB and data packets in a buffer of another LCH with a lower priority have smaller values of the remaining PDB, when a particular condition is met, resources are firstly allocated to data packets with a smaller remaining PDB value of the remaining PDB in the buffer of the LCH with a lower priority, and resources are then allocated to data packets in the buffer of the LCH with a higher priority after the PBR of the LCH with a lower priority is met; or, if the PBR of the LCH with a lower priority is not yet met after resources are allocated to the data packets with the smaller remaining PDB value of the remaining PDB in the buffer of the LCH with a lower priority, the following processes is repeated until the PBR of each LCH is met: comparing sizes of remaining PDBs of remaining data packets in the buffers of the two LCHs, and firstly allocating resources to the data packets with a smaller remaining PDB value of the remaining PDB in the buffer of the LCH with a lower priority when a particular condition is met.

The firstly allocating resources to the data packets with a smaller remaining PDB value of the remaining PDB in the buffer of the LCH with a lower priority when a particular condition is met may comprise: firstly allocated resources the data packets with a smaller remaining PDB value of the remaining PDB in the buffer of the LCH with a lower priority when at least one of the following conditions is met:

- a difference in priority between the two LCHs is smaller than the eighteenth predetermined threshold;
- a priority of the LCH with the lower priority is higher than a ninth predetermined priority (i.e., lower than a predetermined threshold;
- a difference in remaining PDB values between the data packets in the buffers of the two LCHs is greater than a nineteenth predetermined threshold; specifically, it is possible that the difference in the smallest remaining PDB value between the data packets in the buffers of the two LCHs is greater than a predetermined threshold;
- a remaining PDB value of data packets in the buffer of the LCH with the lower priority is smaller than a twentieth predetermined threshold; specifically, it is possible that the smaller smallest remaining PDB value among the smallest remaining PDB values of various data packets in the buffers of the two LCHs is smaller than a predetermined threshold; and
- the LCH with a higher priority (in the two LCHs) bears radio bearers except for signaling radio bearers SRB0, SRB1 and/or SRB2.

That is, for two LCHs with different priorities, if data packets in a buffer of a LCH with a higher priority have greater (smallest) values of the remaining PDB and data packets in a buffer of another LCH with a lower priority have smaller (smallest) values of the remaining PDB, and if at least one of: the above conditions is met, resources are firstly allocated to data packets with a lower priority and a smaller (smallest) remaining PDB value for serving, and the other LCH is selected for serving after the PBR of the LCH is met; or, if the PBR of the LCH is not yet met after resources have been allocated to the data packets with a smaller (smallest) remaining PDB value, one LCH is selected for serving by comparing the (smallest) values of the remaining PDB of remaining data packets in the buffers of the two LCHs, and so on until the PBR of each LCH is met.

(4) If there are still remaining resources after the PBR of all LCHs having cached data is met, resources are firstly allocated to a data packet, having a smallest remaining PDB value and/or a remaining PDB value smaller than a fifteenth predetermined threshold; and, if there are a plurality of data packets, having the smallest remaining PDB value and/or the remaining PDB value smaller than the fifteenth predetermined threshold, resources are firstly allocated to data packets belonging to the LCH with a higher priority among the plurality of data packets.

Specifically, if there are still remaining resources after the PBR of all LCHs having cached data is met, the resources are firstly allocated to the data packet, having a smallest remaining PDB vale and/or a remaining PDB value smaller than the predetermined threshold. The LCH selection and resource allocation process generally comprises the following sub-processes.

Sub-process 1: According to the existing standards, the UE firstly selects an LCH having the highest priority among the LCHs having cached data. After the resources allocated for the LCH reach the PBR preconfigured for the LCH, if there are still remaining resources for the UL grant, a LCH with a next highest priority is selected, and so on.

Sub-process 2: If there are still remaining resources for the UL grant after the PBR of all LCHs having cached data is met, the remaining resources are firstly allocated to RLC SDUs having the smallest remaining PDB value and/or a remaining PDB value smaller than the predetermined threshold, in the buffer. If there are a plurality of data packets corresponding to the smallest remaining PDB value and/or a remaining PDB value smaller than the predetermined threshold, the resources are allocated to RLC SDUs with a higher priority in the LCH. If there are still remaining resources for the UL grant after the RLC SDUs are allocated with resources, an LCH with a next higher priority is selected, and so on.

Sub-process 3: If there are still remaining resources for the UL grant after the resources are allocated to all RLC SDUs having the smallest remaining PDB value and/or a remaining PDB value smaller than the predetermined threshold, the remaining resources are firstly allocated to an LCH with the highest priority, and the data transmission of the LCH with the highest priority is maximized.

It is not difficult to know that, in this optional solution, the sub-process 2 is added in comparison to the existing standards. That is, the UE selects an LCH with a higher priority and allocates resources to this LCH on the basis of the PBR (i.e., the subprocess 1), then selects an LCH based on the remaining PDB and allocates resources for this LCH (i.e., the sub-process 2), and maximizes the data transmission of the LCH with a higher priority (i.e., the sub-process 3).

(5) If there are still remaining resources after the PBR of all LCHs having cached data and having a priority higher than an eighth predetermined priority is met, resources are firstly allocated to a data packet, having a smallest remaining PDB value and/or a remaining PDB value smaller than a sixteenth predetermined threshold; and, if there are a plurality of data packets, having the smallest remaining PDB value and/or the remaining PDB value smaller than the sixteenth predetermined threshold, resources are firstly allocated to data packets belonging to the LCH with a higher priority among the plurality of data packets.

Specifically, after the PBR of the LCH with cached data and a priority higher than the predetermined priority is met, resources are firstly allocated the data packet, having a smallest remaining PDB value and/or a remaining PDB value smaller than the predetermined threshold. The LCH selection and resource allocation process generally comprises the following sub-processes.

Sub-process 1: The UE firstly selects an LCH having the highest priority among the LCHs having cached data and having a priority higher than the predetermined priority. After the resources allocated for the LCH reach the PBR preconfigured for the LCH, if there are still remaining resources for the UL grant, an LCH with a next highest priority among the LCHs with a priority higher than the predetermined priority is selected, and so on.

Sub-process 2: If there are still remaining resources for the UL grant after the PBR of all LCHs having cached data and having a priority higher than the predetermined priority is met, the remaining resources are firstly allocated to RLC SDUs having the smallest remaining PDB value and/or a remaining PDB value smaller than the predetermined threshold, in the buffer. If there are a plurality of data packets corresponding to the smallest remaining PDB value and/or a remaining PDB value smaller than the predetermined threshold, the resources are allocated to RLC SDUs with a higher priority in the LCH. If there are still remaining resources for the UL grant after the RLC SDUs are allocated with resources, an LCH with a next higher priority is selected, and so on.

Sub-process 3: If there are still remaining resources for the UL grant after the resources are allocated to all RLC SDUs having the smallest remaining PDB value and/or a remaining PDB value smaller than the predetermined threshold, the UE firstly selects an LCH with the highest priority among the LCHs that have cached data and are not served. After the resources allocated for the LCH reach the PBR allocated for the LCH, if there are still remaining resources for the UL grant, an LCH with a next highest priority is selected, and so on.

Sub-process 4: If there are still remaining resources for the UL grant after the PBR of all LCHs having cached data and having a priority lower than the predetermined priority is met, the remaining resources are firstly allocated to the LCH with the highest priority, and the data transmission of the LCH with the highest priority is maximized.

It is not difficult to know that, in this optional solution, the sub-process 2 in the existing standards is subdivided into the above sub-processes 1 and 3, and the subprocess 2 is added. That is, the UE firstly selects an LCH with a priority higher than the predetermined priority and allocates resources to this LCH on the basis of PBR (i.e., the sub-process 1), then selects an LCH based on the remaining PDB and allocates resources to this LCH (i.e., the sub-process 2), then selects an LCH with a priority lower than the predetermined priority and allocates resources to this LCH on the basis of PBR (i.e., the sub-process 3), and maximizes the data transmission of the LCH with the highest priority (i.e., the sub-process 4).

(6) Data packets, having a remaining PDB with a remaining PDB value smaller than a seventeenth predetermined threshold are determined as having a highest transmission priority.

Specifically, if the remaining PDB value of a data packet is smaller than a predetermined threshold, this data packet has the highest transmission priority. The LCH selection and resource allocation process generally comprises the following subprocesses.

Sub-process 1: The UE firstly allocate resources to RLC SDUs having a remaining PDB with a remaining PDB value smaller than the predetermined threshold, and firstly selects PCL SDUs having the smallest remaining PDB value. If there are a plurality of data packets corresponding to the smallest remaining PDB value, resources are firstly allocated to RLC SDUs with the highest priority in the LCH. If there are still remaining resources for the UL grant after the sources are allocated, an LCH with a next highest priority is selected, and so on. If there are still remaining resources for the UL grant after the resources are allocated to all data packets corresponding to the smallest remaining PDB value, an RLC SDU having a next remaining PDB value is selected for serving, and so on.

Sub-process 2: If there are still remaining resources for the UL grant after the resources are allocated to all RLC SDUs having a remaining PDB with a remaining PDB value smaller than the predetermined threshold, the UE firstly selects an LCH with the highest priority among the LCHs having cached data. After the resources allocated for the LCH reach the PBR preconfigured for the LCH, if there are still remaining resources for the UL grant, an LCH with a next highest priority is selected, and so on.

Sub-process 3: If there are still remaining resources for the UL grant after the PBR of all LCHs having cached data is met, the remaining resources are firstly allocated to the LCH with the highest priority, and the data transmission of the LCH with the highest priority is maximized.

It is not difficult to know that, in this optional solution, the sub-process 1 is added in comparison to the existing standards. That is, the UE firstly allocates resources to the data packets, having a remaining PDB with a remaining PDB value smaller than the predetermined threshold (i.e., the sub-process 1), then selects an LCH with a higher priority and allocates resources to this LCH on the basis of PBR (i.e., the sub-process 2), and maximizes the data transmission of the LCH with a higher priority (i.e., the sub-process 3).

In accordance with the communication method provided in this embodiment of the present disclosure, for an uplink scheduling (including dynamic scheduling and semi-static scheduling) given by the base station, the UE can consider the remaining PDB of the data packet and the priority of the LCH when the UE selects an LCH and allocates resource for the LCH, thereby effectively reducing the packet loss rate of data packets.

Figure 16:
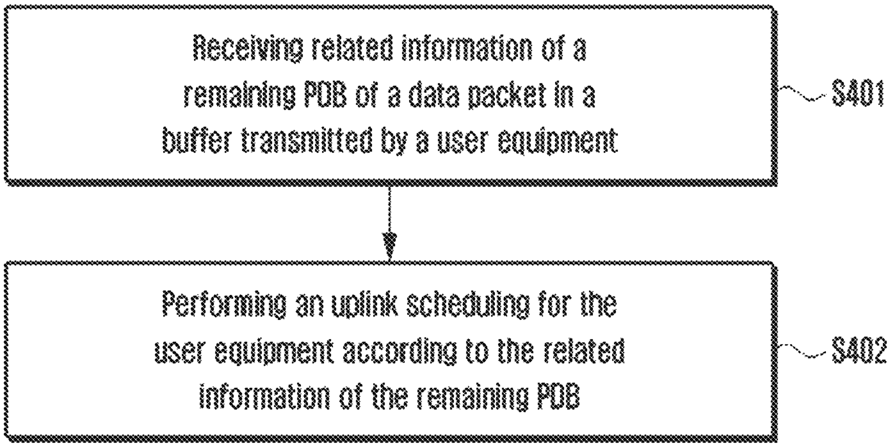
FIG. 16 is a flowchart of further another communication method according to an embodiment of the present disclosure.

An embodiment of the present disclosure further provides a communication method, as shown in FIG. 16, comprising the following steps.

Step S401: receiving related information of a remaining PDB of a data packet in a buffer transmitted by a user equipment.

Step S402: performing an uplink scheduling for the User Equipment according to the related information of the remaining PDB.

The execution body of the method is a base station, and the specific implementation may refer to the description of the UE side and will not be repeated here.

It is to be noted that the marks of different predetermined thresholds and predetermined priorities are merely for distinguishing these predetermined thresholds and predetermined priorities, and are not intended to limit the size or objects of these predetermined thresholds and predetermined priorities. These predetermined thresholds and predetermined priorities may be predefined, or preconfigured by the base station.

Figure 17:
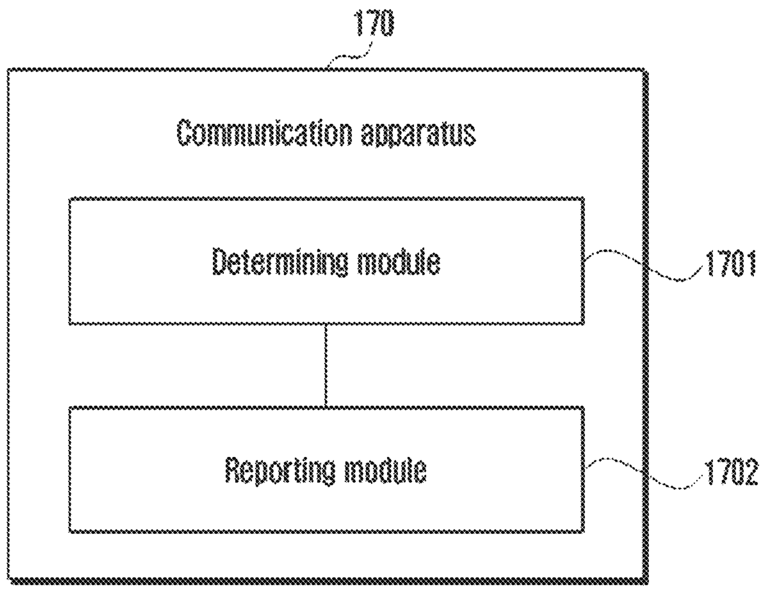
FIG. 17 is a schematic structure diagram of a communication apparatus according to an embodiment of the present disclosure.

An embodiment of the present disclosure provides a communication apparatus. As shown in FIG. 17, the communication apparatus 170 may comprise: a determining module 1701 and a reporting module 1702, wherein:

the determining module 1701 is configured to determine a remaining PDB of a data packet in a buffer; and the reporting module 1702 is configured to report related information of the remaining PDB to a base station.

In one optional implementation, when the reporting module 1702 is configured to report the related information of the remaining PDB to the base station, it is specifically configured to perform at least one of the following:

reporting a remaining PDB value of the remaining PDB to the base station;

reporting, to the base station, information indicating whether the remaining PDB value is smaller than a first predetermined threshold;

reporting, to the base station, a size of a data packet having a remaining PDB with a remaining PDB value smaller than the first predetermined threshold, or a relative ratio of the size of the data packet; and reporting, to the base station, the ID of an LCH or an LCG to which a data packet, having a remaining PDB with a remaining PDB value smaller than the first predetermined threshold, belongs;

wherein the relative ratio of the size of the data packet comprises any one of the following:

a ratio of the size of the data packet relative to a total amount of data in all buffers;

a ratio of the size of the data packet relative to a total amount of data in an LCG to which the data packet belongs; and a ratio of the size of the data packet relative to a total amount of data in an LCH to which the data packet belongs.

In one optional implementation, when the reporting module 1702 is configured to report the remaining PDB value to the base station, it is further configured to perform at least one of the following:

reporting, to the base station, a size of a data packet corresponding to the remaining PDB, or a relative ratio of the size of the data packet; and reporting, to the base station, the ID of an LCH or an LCG to which a data packet corresponding to the remaining PDB belongs.

In one optional implementation, the unit of the remaining PDB value is millisecond, or time slot under a reference subcarrier interval.

In one optional implementation, the reference subcarrier interval comprises at least one of the following:

a subcarrier interval used by an uplink transmission for reporting the remaining PDB;

a subcarrier interval of the current uplink activated BWP;

a subcarrier interval of an uplink activated BWP of a primary serving cell when a plurality of uplink serving cells are configured;

the maximum subcarrier interval among subcarrier intervals of all uplink BWPs configured currently;

the maximum subcarrier interval among subcarrier intervals of all uplink BWPs of all serving cells when a plurality of uplink serving cells are configured;

a reference subcarrier interval configured by the base station; and a predetermined reference subcarrier interval.

In one optional implementation, when the reporting module 1702 is configured to report the remaining PDB value to the base station, it is specifically configured to perform at least one of the following:

if a data packet corresponding to the remaining PDB is sensitive to delay, reporting the remaining PDB value to the base station; and if a data packet corresponding to the remaining PDB is insensitive to delay, reporting, to the base station, the remaining PDB as infinity.

In one optional implementation, when the reporting module 1701 is configured to report the related information of the remaining PDB to the base station, it is specifically configured to perform at least one of the following:

reporting related information of a remaining PDB of at least one data packet in a buffer of one LCH;

reporting related information of a remaining PDB of at least one data packet in a buffer of one LCG, the one LCG comprising a group of LCHs;

reporting related information of a remaining PDB of at least one data packet in a buffer of all LCHs corresponding to a data radio bearer; and reporting related information of a remaining PDB of at least one data packet in a buffer of all LCHs.

In one optional implementation, when the reporting module 1702 is configured to report the related information of the remaining PDB of at least one data packet if a remaining PDB value of the remaining PDB is reported to the base station, it is specifically configured to perform at least one of the following:

reporting a remaining PDB value of the remaining PDB of each data packet to the base station;

reporting, to the base station, a remaining PDB value smaller than a second predetermined threshold, among remaining PDB values of various data packets;

reporting, to the base station, a smallest remaining PDB value among remaining PDB values of various data packets;

reporting, to the base station, a smallest remaining PDB value smaller than the second predetermined threshold, among remaining PDB values of various data packets;

reporting, to the base station, N smallest remaining PDB values among remaining PDB values of various data packets; and reporting, to the base station, N smallest remaining PDB values smaller than the second predetermined threshold, among remaining PDB values of various data packets;

wherein the N is a preconfigured or predefined positive integer.

In one optional implementation, before the related information of the remaining PDB is reported to the base station, the determining module 1701 is further configured to:

determine an LCH or an LCG, which is necessary to be reported, of the remaining PDB, according to at least one of the following:

an LCH or an LCG corresponding to the data radio bearer;

an ID of an LCH or an ID of LCG configured by the base station;

a predefined ID of an LCH or a predefined ID of LCG; and an LCH or an LCG having a priority higher than a first predetermined priority.

In one optional implementation, before the related information of the remaining PDB is reported to the base station, the reporting module 1702 is further configured to:

trigger the UE to report the related information of the remaining PDB to the base station by at least one of the following:

triggering instructed by the base station through a dedicated signaling;

periodically triggering according to a predetermined period; and event triggering satisfying a particular condition.

In one optional implementation, the event triggering comprises at least one of the following:

a remaining PDB value of a remaining PDB is smaller than a third predetermined threshold;

a priority of an LCH or an LCG to which a data packet corresponding to the remaining PDB belongs is higher than a second predetermined priority;

a size of a data packet corresponding to the remaining PDB is greater than a fourth predetermined threshold;

a data packet corresponding to the remaining PDB has a particular service attribute; and a BSR is triggered and there are data in the buffer.

In one optional implementation, when the BSR is triggered to trigger the UE to report the related information of the remaining PDB to the base station, when the reporting module 1702 is configured to report the related information of the remaining PDB to the base station, it is specifically configured to:

report the remaining PDB and the BSR to the base station.

In one optional implementation, when the reporting module 1702 is configured to report the remaining PDB and the BSR to the base station, it is specifically configured to perform at least one of the following:

the BSR counts the total size of all data packets in the corresponding buffer; and the BSR counts a size of a data packet corresponding to the remaining PDB in the corresponding buffer.

In one optional implementation, if the BSR is triggered, triggering the UE to report the related information of the remaining PDB to the base station comprises:

triggering the UE to report the related information of the remaining PDB to the base station after at least one of the following conditions is met:

the BSR is greater than 0;

the data of a particular service is contained in the buffer;

a remaining PDB value of a remaining PDB is smaller than a fifth predetermined threshold;

a priority of an LCH or an LCG to which a data packet corresponding to the remaining PDB belongs is higher than a third predetermined priority; and a size of a data packet corresponding to the remaining PDB is greater than a sixth predetermined threshold.

In one optional implementation, when the reporting module 1702 is configured to report the related information of the remaining PDB to the base station, it is specifically configured to perform at least one of the following:

indicating the remaining PDB by a newly defined MAC CE;

indicating the remaining PDB by enhancing an existing BSR MAC CE; and indicating the remaining PDB by a dedicated SR resource.

In one optional implementation, when the reporting module 1702 is configured to indicate the remaining PDB by a newly defined MAC CE, it is specifically configured to perform at least one of the following:

the newly defined MAC CE comprise indication information of the remaining PDB; and the newly defined MAC CE comprises indication information of the remaining PDB and indication information of the BSR.

In one optional implementation, when the reporting module 1702 is configured to indicate the remaining PDB by enhancing an existing BSR MAC CE, it is specifically configured to:

remain load bits of the existing BSR MAC CE unchanged, and use 1 bit in the existing Buffer Size indication field to indicate whether there is a data packet, having a remaining PDB with a remaining PDB value smaller than a seventh predetermined threshold, in the corresponding buffer, the 1 bit being a highest-order bit or a lowest-order bit of the Buffer Size indication field.

In one optional implementation, if the 1 bit indicates that there is a data packet, having a remaining PDB with a remaining PDB value smaller than the seventh predetermined threshold, in the corresponding buffer, other bits of the Buffer Size indication field other than the 1 bit indicate a size of the data packet, having a remaining PDB value of the remaining PDB smaller than the seventh predetermined threshold, in the corresponding buffer; and if the 1 bit indicates that there is not a data packet, having a remaining PDB with a remaining PDB value smaller than the seventh predetermined threshold, in the corresponding buffer, other bits of the Buffer Size indication field other than the 1 bit indicate a total amount of data of all data packets in the corresponding buffer.

In one optional implementation, when the reporting module 1702 is configured to indicate the remaining PDB by dedicated SR resource, it is specifically configured to perform at least one of the following:

one SR configuration corresponds to a case where a smallest remaining PDB value of remaining PDBs of data packets in all buffers is within a predetermined range;

one SR configuration corresponds to a case where a smallest remaining PDB value of remaining PDBs of data packets in buffers of one or more LCHs is within a predetermined range;

one SR configuration corresponds to a case where a smallest remaining PDB value of remaining PDBs of data packets in all buffers is smaller than the seventh predetermined threshold; and one SR configuration corresponds to a case where a smallest remaining PDB value of remaining PDBs of data packets in buffers of one or more LCHs is smaller than the seventh predetermined threshold;

wherein the one SR configuration comprises a group of PUCCH resources on different BWPs.

In one optional implementation, the newly defined MAC CE comprises at least one of the following:

an MAC CE containing at least one of: a smallest remaining PDB value of remaining PDBs of data packets in all buffers, a size of the data packet corresponding to a smallest remaining PDB value of remaining PDBs of data packets in all buffers, or a relative ratio of the size of the data packet, and an ID of an LCH or an LCG to which a data packet corresponding to a smallest remaining PDB value of remaining PDBs of data packets in all buffers belongs;

an MAC CE containing at least one of: a size of the data packet, having a remaining PDB with a remaining PDB value smaller than an eighth predetermined threshold, of data packets in all buffers, or a relative ratio of the size of the data packet, and an ID of an LCH or an LCG to which a data packet, having a remaining PDB with a remaining PDB value smaller than the eighth predetermined threshold, belongs;

an MAC CE containing at least one of: an ID of one LCH or one LCG, a smallest remaining PDB value of remaining PDBs of data packets in a buffer of the one LCH or the one LCG, and a size of the data packet corresponding to a smallest remaining PDB value of remaining PDBs of data packets in a buffer of the one LCH or the one LCG, or a relative ratio of the size of the data packet;

an MAC CE containing at least one of: an ID of one LCH or one LCG, and a size of the data packet, having a remaining PDB with a remaining PDB value smaller than the eighth predetermined threshold, in a buffer of the one LCH or the one LCG, or a relative ratio of the size of the data packet;

an MAC CE containing at least one of: an ID of one LCH or one LCG, the total amount of data in a buffer of the one LCH or the one LCG, a smallest remaining PDB value of remaining PDBs of data packets in a buffer of the one LCH or the one LCG, and a size of the data packet corresponding to a smallest remaining PDB value of remaining PDBs of data packets in a buffer of the one LCH or the one LCG, or a relative ratio of the size of the data packet;

an MAC CE containing at least one of: an ID of one LCH or one LCG, the total amount of data in a buffer of the one LCH or the one LCG and a size of the data packet, having a remaining PDB with a remaining PDB value smaller than the eighth predetermined threshold, in a buffer of the one LCH or the one LCG, or a relative ratio of the size of the data packet;

an MAC CE containing at least one of: the amount of data in respective buffers of a plurality of LCGs, a smallest remaining PDB value of remaining PDBs of data packets in respective buffers of the plurality of LCGs, and a size of the data packet corresponding to the plurality of remaining PDBs, or a relative ratio of the size of the data packet;

an MAC CE containing at least one of: the amount of data in respective buffers of a plurality of LCGs and a size of the data packet, having a remaining PDB with a remaining PDB value smaller than the eighth predetermined threshold, in respective buffers of the plurality of LCGs, or a relative ratio of the size of the data packet;

an MAC CE containing at least one of: the amount of data in respective buffers of a plurality of LCGs, a smallest remaining PDB value of remaining PDBs of data packets in respective buffers of the plurality of LCGs, and a size of the data packet corresponding to a smallest remaining PDB value of remaining PDBs of data packets in all buffers of the plurality of LCGs, or a relative ratio of the size of the data packet; and an MAC CE containing at least one of: the amount of data in respective buffers of a plurality of LCGs and a size of the data packet, having a remaining PDB with a remaining PDB value smaller than the eighth predetermined threshold, in all buffers of the plurality of LCGs, or a relative ratio of the size of the data packet.

In one optional implementation, the reporting module 1702 is further configured to:

report, to the base station, at least one of: the service type of data packets, the PDB requirement, the moment when the buffer is reached, the waiting time in the buffer or the expiration moment of the PDB.

The apparatus according to the embodiment of the present disclosure can execute the methods provided in the above embodiments, and the implementation principles thereof are similar. The acts executed by the modules in the apparatus according to the embodiment of the present disclosure correspond to the steps of the methods according to the embodiments of the present disclosure. The detailed functional description of the modules in the apparatus and the achieved beneficial effects can refer to the description of the corresponding methods described above and will not be repeated here.

Figure 18:
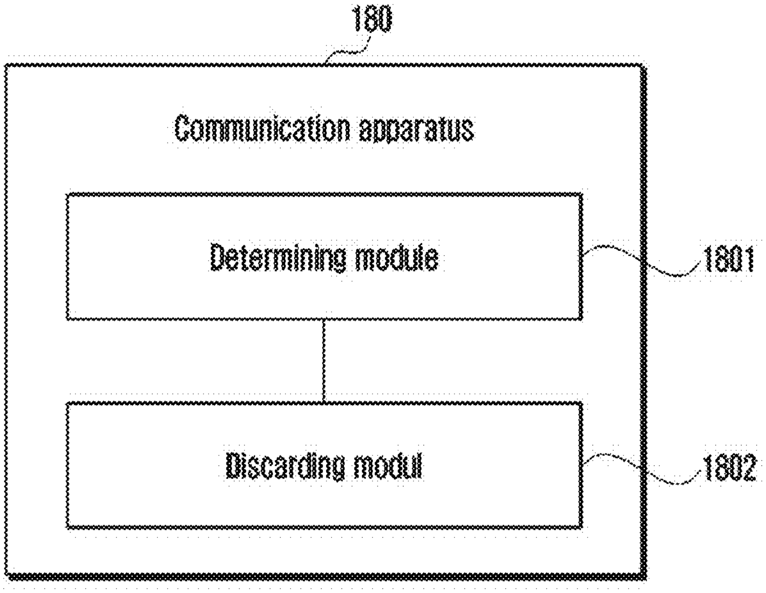
FIG. 18 is a schematic structure diagram of still another communication apparatus according to an embodiment of the present disclosure.

An embodiment of the present disclosure provides a communication apparatus. As shown in FIG. 18, the communication apparatus 180 may comprise: a determining module 1801 and a discarding module 1802, wherein:

the determining module 1801 is configured to determine a remaining PDB of a data packet in a buffer; and the discarding module 1802 is configured to discard the corresponding data packet if a remaining PDB value of the remaining PDB is 0 or the remaining PDB value is smaller than a ninth predetermined threshold.

In one optional implementation, when the discarding module 1802 is configured to determine whether to discard the corresponding data packet according to the remaining PDB, it is specifically configured to:

determine whether the remaining PDB is 0 or whether the remaining PDB value is smaller than the ninth predetermined threshold; and discard the corresponding data packet if a remaining PDB value of the remaining PDB is 0 or the remaining PDB value is smaller than the ninth predetermined threshold.

In one optional implementation, the discarding module 1802 is specifically configured to perform at least one of the following:

determine whether a size of a data packet corresponding to the remaining PDB is greater than a tenth predetermined threshold, and discard the corresponding data packet if a size of a data packet corresponding to the remaining PDB is greater than the tenth predetermined threshold; and determine whether a priority of an LCH or an LCG to which the remaining PDB belongs is greater than a fourth predetermined priority, and discard the corresponding data packet if the priority of the LCH or the LCG to which the remaining PDB belongs is greater than the fourth predetermined priority.

In one optional implementation, before determining the remaining PDB of the data packet in the buffer, the determining module 1801 is further configured to:

determine an LCH or an LCG in which the data packet can be discarded, according to at least one of the following:

an ID of an LCH or an ID of LCG configured by the base station;

a predefined ID of an LCH or a predefined ID of LCG; and an LCH or an LCG having a priority lower than a fifth predetermined priority.

In one optional implementation, after discarding the corresponding data packet, the discarding module 1802 is further configured to:

trigger a BSR.

In one optional implementation, when the discarding module 1802 is configured to trigger a BSR, it is specifically configured to:

trigger a BSR when at least one of the following conditions is met:

the amount of data of the discarded data packet exceeds an eleventh predetermined threshold;

the remaining amount of data in the current buffer is smaller than a twelfth predetermined threshold;

the LCH to which the discarded data packet belongs is an LCH having the highest priority among all LCHs that have cached data currently; and the priority of the LCH to which the discarded data packet belongs is higher than a seventh predetermined priority.

In one optional implementation, the discarding module 1802 is further configured to:

if the PDB of data contained in an MAC PDU in a buffer of an HARQ process times out or the remaining PDB value is smaller than a thirteenth predetermined threshold, and the MAC PDU does not contain any MAC CE or does not contain a predetermined MAC CE, discard the MAC PDU in the buffer of the HARQ process;

after the corresponding data packet is discarded and if a retransmission scheduling for the HARQ process is received, further comprising at least one of the following:

skipping the retransmission scheduling; and recombining a new MAC PDU for transmission on a resource of the retransmission scheduling, and reporting the base station that the transmitted MAC PDU is the new MAC PDU through an explicit or implicit signaling.

In one optional implementation, when the discarding module 1802 is configured to discard the corresponding data packet, it is specifically configured to:

discard the corresponding data packet according to an indication of a dedicated signal for discarding the data packet issued by the base station.

The apparatus according to the embodiment of the present disclosure can execute the methods provided in the above embodiments, and the implementation principles thereof are similar. The acts executed by the modules in the apparatus according to the embodiment of the present disclosure correspond to the steps of the methods according to the embodiments of the present disclosure. The detailed functional description of the modules in the apparatus and the achieved beneficial effects can refer to the description of the corresponding methods described above and will not be repeated here.

Figure 19:
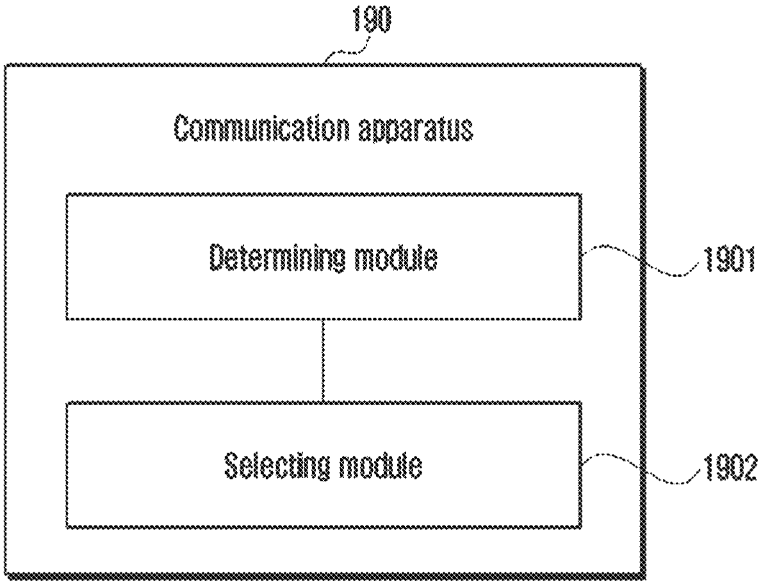
FIG. 19 is a schematic structure diagram of yet another communication apparatus according to an embodiment of the present disclosure.

An embodiment of the present disclosure provides a communication apparatus. As shown in FIG. 19, the communication apparatus 190 may comprise: a determining module 1901 and a selecting module 1902, wherein:

the determining module 1901 is configured to determine a remaining PDB of a data packet in a buffer of an LCH; and the Selecting module 1902 is configured select an LCH and allocate resources for an uplink scheduling based on the remaining PDB.

In one optional implementation, when the Selecting module 1902 is configured to select an LCH and allocate resources for an uplink scheduling based on the remaining PDB, it is specifically configured to perform at least one of the following:

for one selected LCH, if a plurality of data packets are contained in a buffer of the LCH and the plurality of data packets correspond to different remaining PDBs, firstly allocating resources to a data packet, having a smallest remaining PDB value and/or a remaining PDB value smaller than a fourteenth predetermined threshold, in the buffer of the LCH; and, if there are a plurality of data packets, having the smallest remaining PDB value and/or the remaining PDB value smaller than the fourteenth predetermined threshold, firstly allocating resources to a data packet with a shortest arrival time among the plurality of data packets;

for two LCHs with the same priority, if data packets in buffers of the two LCHs have different remaining PDBs, firstly allocating resources to data packets in a buffer of the first LCH with a smaller remaining PDB value, and then allocating resources to data packets in a buffer of the other second LCH after the PBR of the first LCH is met; or, if the PBR of the first LCH is not yet met after resources are allocated to the data packets with the smaller remaining PDB value of the remaining PDB in the buffer of the first LCH, repeating the following processes until the PBR of each LCH is met: comparing sizes of remaining PDBs of remaining data packets in the buffers of the two LCHs, and allocating resources to data packets in a buffer of one LCH with a smaller remaining PDB value;

for two LCHs with different priorities, if data packets in a buffer of a LCH with a higher priority have a greater remaining PDB value of the remaining PDB and data packets in a buffer of another LCH with a lower priority have smaller values of the remaining PDB, when a particular condition is met, firstly allocating the resources to the data packets with the smaller remaining PDB value of the remaining PDB in the buffer of the LCH with a lower priority, and then allocating resources to data packets in the buffer of the LCH with a higher priority after the PBR of the LCH with a lower priority is met; or, if the PBR of the LCH with a lower priority is not yet met after resources are allocated to the data packets with the smaller remaining PDB value of the remaining PDB in the buffer of the LCH with a lower priority, repeating the following processes until the PBR of each LCH is met: comparing sizes of remaining PDBs of remaining data packets in the buffers of the two LCHs, and firstly allocating resources to the data packets with a smaller remaining PDB value of the remaining PDB in the buffer of the LCH with a lower priority when a particular condition is met;

if there are still remaining resources after the PBR of all LCHs having cached data is met, firstly allocating resources to a data packet, having a smallest remaining PDB value and/or a remaining PDB value smaller than a fifteenth predetermined threshold; and, if there are a plurality of data packets, having the smallest remaining PDB value and/or the remaining PDB value smaller than the fifteenth predetermined threshold, firstly allocating resources to data packets belonging to the LCH with a higher priority among the plurality of data packets;

if there are still remaining resources after the PBR of all LCHs having cached data and having a priority higher than an eighth predetermined priority is met, firstly allocating resources to a data packet, having a smallest remaining PDB value and/or a remaining PDB value smaller than a sixteenth predetermined threshold; and, if there are a plurality of data packets, having the smallest remaining PDB value and/or the remaining PDB value smaller than the sixteenth predetermined threshold, firstly allocating resources to data packets belonging to the LCH with a higher priority among the plurality of data packets; and determining a data packet, having a remaining PDB with a remaining PDB value smaller than a seventeenth predetermined threshold, as having a highest transmission priority.

In one optional implementation, when the Selecting module 1902 is configured to firstly allocate resources to the data packets with a smaller remaining PDB value of the remaining PDB in the buffer of the LCH with a lower priority when a particular condition is met, it is specifically configured to:

when at least one of the following conditions is met, firstly allocating the resources to the data packets with the smaller remaining PDB value of the remaining PDB in the buffer of the LCH with a lower priority:

a difference in priority between the two LCHs is smaller than an eighteenth predetermined threshold;

a priority of the LCH with the lower priority is higher than a ninth predetermined priority;

a difference in remaining PDB values between the data packets in the buffers of the two LCHs is greater than a nineteenth predetermined threshold;

a remaining PDB value of data packets in the buffer of the LCH with the lower priority is smaller than a twentieth predetermined threshold; and the LCH with the higher priority bears radio bearers except for signaling radio bearers SRB0, SRB1 and/or SRB2.

The apparatus according to the embodiment of the present disclosure can execute the methods provided in the above embodiments, and the implementation principles thereof are similar. The acts executed by the modules in the apparatus according to the embodiment of the present disclosure correspond to the steps of the methods according to the embodiments of the present disclosure. The detailed functional description of the modules in the apparatus and the achieved beneficial effects can refer to the description of the corresponding methods described above and will not be repeated here.

Figure 20:
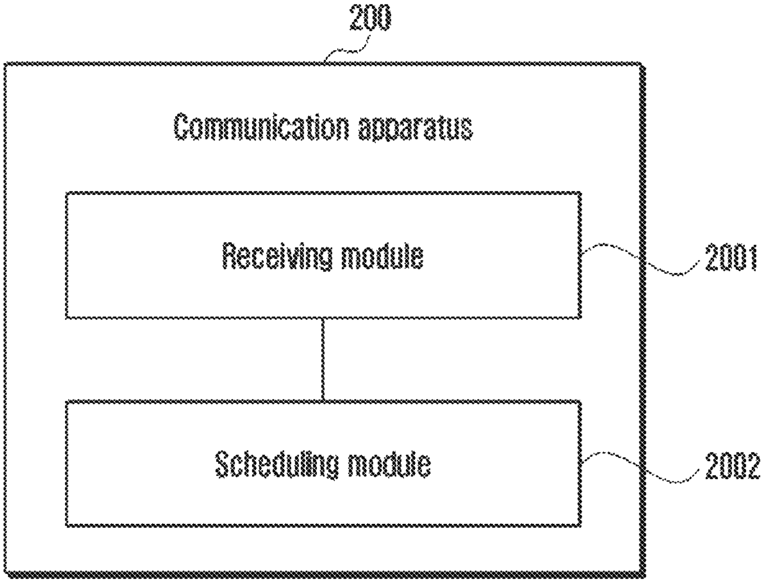
FIG. 20 is a schematic structure diagram of further another communication apparatus according to an embodiment of the present disclosure.

An embodiment of the present disclosure provides a communication apparatus. As shown in FIG. 20, the communication apparatus 200 may comprise: a receiving module 2001 and a scheduling module 2002, wherein:

the receiving module 2002 is configured to receive related information of a remaining PDB of a data packet in a buffer transmitted by a user equipment; and the scheduling module 2002 is configured to perform an uplink scheduling for the User Equipment according to the related information of the remaining PDB.

The apparatus according to the embodiment of the present disclosure can execute the methods provided in the above embodiments, and the implementation principles thereof are similar. The acts executed by the modules in the apparatus according to the embodiment of the present disclosure correspond to the steps of the methods according to the embodiments of the present disclosure. The detailed functional description of the modules in the apparatus and the achieved beneficial effects can refer to the description of the corresponding methods described above and will not be repeated here.

An embodiment of the present disclosure provides an electronic device, comprising: a transceiver; and, a processor, which is coupled to the transceiver and configured to control to execute the computer programs to implement the steps in the above method embodiments.

Figure 21:
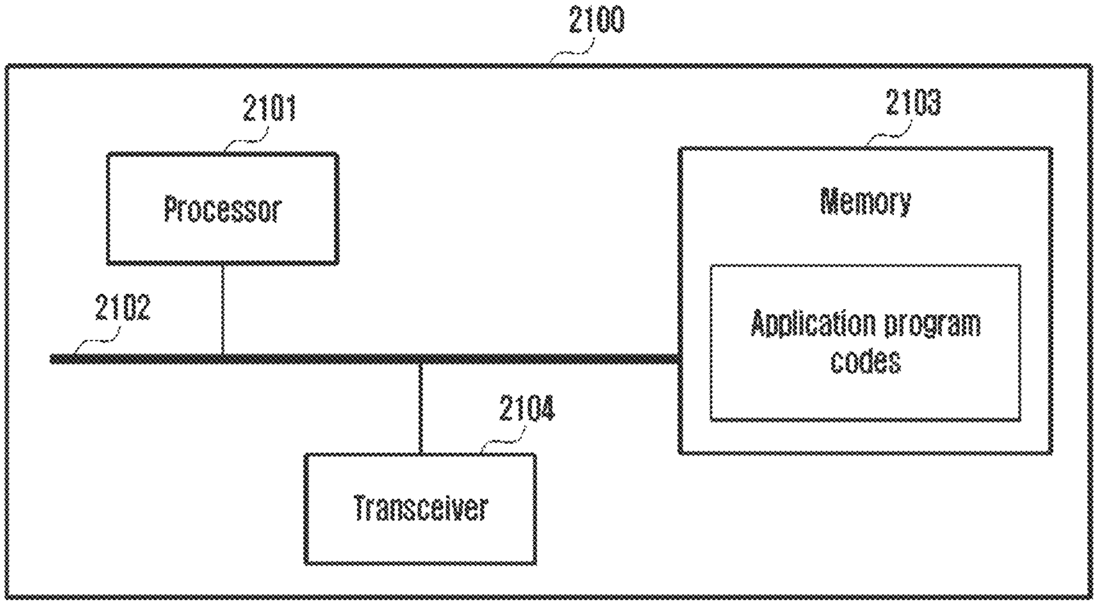
FIG. 21 is a schematic structure diagram of an electronic device according to an embodiment of the present disclosure.

In one optional embodiment, an electronic device is provided, as shown in FIG. 21. The electronic device 2100 shown in FIG. 21 comprises a processor 2101 and a memory 2103. The processor 2101 is connected to the memory 2103, for example, via a bus 2102. Optionally, the electronic device 2100 may further comprise a transceiver 2104. The transceiver 2104 may be configured for data interaction between the electronic device and other electronic devices, for example, transmitting data and/or receiving data, etc. It is to be noted that, in practical applications, the number of the transceiver 2104 is not limited to 1, and the structure of the electronic device 2100 does not constitute any limitations to the embodiments of the present disclosure.

The processor 2101 may be a Central Processing Unit (CPU), a general-purpose processor, a Digital Signal Processor (DSP), an Application Specific Integrated Circuit (ASIC), a Field Programmable Gate Array (FPGA) or other programmable logic devices, a transistor logic device, a hardware component or any combination thereof. The processor can implement or execute various exemplary logic blocks, modules and circuits described in the disclosure of the present disclosure. The processor 2101 may also be a combination for realizing computing functions, for example, a combination of one or more microprocessors, a combination of DSPs and microprocessors, etc.

The bus 2102 may comprise a passageway for transferring information between the above components. The bus 2102 may be a Peripheral Component Interconnect (PCI) bus, an Extended Industry Standard Architecture (EISA) bus, etc. The bus 2102 may be classified into address bus, data bus, control bus, etc. For ease of representation, the bus is represented by only one bold line in FIG. 21, but it does not mean that there is only one bus or one type of buses.

The memory 2103 may be, but not limited to, Read Only Memories (ROMs) or other types of static storage devices capable of storing static information and instructions, Random Access Memories (RAMs) or other types of dynamic storage devices capable of storing information and instructions, or Electrically Erasable Programmable Read Only Memories (EEPROMs), Compact Disc Read Only Memories (CD-ROMs) or other optical disc storages, optical disc storages (including Compact Discs, laser discs, optical discs, digital versatile optical discs, Blu-ray discs, etc.), magnetic disc storage mediums or other magnetic storage devices, or any other medium that can be used to carry or store computer programs and can be accessed by a computer.

The memory 2103 is configured to store compute programs for executing the embodiments of the present disclosure, and is controlled by the processor 2101. The processor 2101 is configured to execute the computer programs stored in the memory 2103 to implement the steps in the above method embodiments.

An embodiment of the present disclosure provides a computer-readable storage medium having a computer program stored thereon, when the computer program executed by a processor, the processor can implement steps and corresponding contents in the above method embodiments.

An embodiment of the present disclosure further provides a computer program product, comprising computer programs that, when executed by a processor, can implement the steps and corresponding contents in the above method embodiments.

It should be understood that, although the operation steps are indicated by arrows in the flowcharts of the embodiments of the present disclosure, the implementation order of these steps is not limited to the order indicated by the arrows. Unless otherwise explicitly stated herein, in some implementation scenarios of the embodiments of the present disclosure, the implementation steps in the flowcharts may be executed in other orders as required. In addition, depending on practical implementation scenarios, some or all of the steps in the flowcharts may comprise a plurality of sub-steps or a plurality of stages. Some or all of these sub-steps or stages may be executed at the same moment, and each of these sub-steps or stages may be separately executed at different moments. When each of these sub-steps or stages is executed at different moments, the execution order of these sub-steps or stages may be flexibly configured as required, and will not be limited in the embodiments of the present disclosure.

The foregoing description merely shows the optional implementations of some implementation scenarios of the present disclosure. It should be pointed out that, for a person of ordinary skill in the art, without departing from the technical idea of the solutions of the present disclosure, other similar implementation means based on the technical idea of the present disclosure shall also fall into the protection scope of the embodiments of the present disclosure.

The invention claimed is:

1. A method performed by a user equipment (UE) in a wireless communication system, the method comprising:

determining whether a smallest remaining packet delay budget (PDB) value among remaining PDB values of data units in a buffer is smaller than a threshold;

in case that the smallest remaining PDB value is smaller than the threshold, triggering a delay report associated with a logical channel group (LCG); and transmitting, to a base station, the delay report, wherein the delay report includes the smallest remaining PDB value among the remaining PDB values for the LCG.

2. The method of claim 1, wherein the delay report includes an indication bit for indicating whether the delay report is transmitted for an LCG.

3. The method of claim 1, wherein the delay report includes buffer size information for indicating an amount of data for the LCG.

4. The method of claim 1, wherein the delay report is transmitted in a medium access control (MAC)-control element (CE).

5. The method of claim 1, further comprising:

discarding a data packet associated with a remaining PDB value of 0.

6. The method of claim 1, wherein the delay report is transmitted in a dedicated scheduling request (SR) resource.

7. The method of claim 6, wherein the delay report includes an SR configuration corresponding to a condition that the smallest remaining PDB value of the remaining PDB values of the data units in all buffers is within a predetermined range.

8. A user equipment (UE) in a wireless communication system, the UE comprising:

a transceiver; and a controller coupled with the transceiver and configured to:

determine whether a smallest remaining packet delay budget (PDB) value among remaining PDB values of data units in a buffer is smaller than a threshold, in case that the smallest remaining PDB value is smaller than the threshold, trigger a delay report associated with a logical channel group (LCG), and transmit, to a base station, the delay report, wherein the delay report includes the smallest remaining PDB value among the remaining PDB values for the LCG.

9. The UE of claim 8, wherein the delay report includes an indication bit for indicating whether the delay report is transmitted for an LCG.

10. The UE of claim 8, wherein the delay report includes buffer size information for indicating an amount of data for the LCG.

11. The UE of claim 8, wherein the delay report is transmitted in a medium access control (MAC)-control element (CE).

12. The UE of claim 8, wherein the controller is further configured to:

discard a data packet associated with a remaining PDB value of 0.

13. The UE of claim 8, wherein the delay report is transmitted in a dedicated scheduling request (SR) resource.

14. The UE of claim 13, wherein the delay report includes an SR configuration corresponding to a condition that the smallest remaining PDB value of the remaining PDB values of the data units in all buffers is within a predetermined range.

* * * * *